US010540821B2

(12) United States Patent
Musunuri et al.

(10) Patent No.: US 10,540,821 B2
(45) Date of Patent: Jan. 21, 2020

(54) DYNAMIC ITEM PLACEMENT USING 3-DIMENSIONAL OPTIMIZATION OF SPACE

(71) Applicant: Staples, Inc., Framingham, MA (US)

(72) Inventors: Vishal Musunuri, Belmont, MA (US); Michael Bhaskaran, Sherborn, MA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 15/917,239

(22) Filed: Mar. 9, 2018

(65) Prior Publication Data

US 2019/0279426 A1    Sep. 12, 2019

(51) Int. Cl.
| | |
|---|---|
| *G06Q 10/08* | (2012.01) |
| *G06Q 50/28* | (2012.01) |
| *G06T 19/00* | (2011.01) |
| *G06T 7/70* | (2017.01) |
| *G06T 7/62* | (2017.01) |
| *G06K 9/00* | (2006.01) |
| *G06K 9/03* | (2006.01) |
| *G06T 19/20* | (2011.01) |

(52) U.S. Cl.
CPC ........ *G06T 19/006* (2013.01); *G06K 9/00671* (2013.01); *G06K 9/03* (2013.01); *G06T 7/62* (2017.01); *G06T 7/70* (2017.01); *G06T 19/20* (2013.01); *G06T 2219/2004* (2013.01); *G06T 2219/2016* (2013.01)

(58) Field of Classification Search
CPC .................................................... G06T 19/006
USPC ......................................................... 345/633
See application file for complete search history.

(56) References Cited

U.S. PATENT DOCUMENTS

| | | | | |
|---|---|---|---|---|
| 8,594,835 | B2* | 11/2013 | Lert ................. | B65G 1/045 700/221 |
| 2007/0156536 | A1* | 7/2007 | Alfandary .......... | G06Q 10/087 705/22 |

(Continued)

FOREIGN PATENT DOCUMENTS

WO    2017059140 A1    6/2017

OTHER PUBLICATIONS

"Using Augmented Reality to Assist Forklift Operation" Bhuvaneswari Sarupuri et al., 2016 ACM.*

(Continued)

*Primary Examiner* — Javid A Amini
(74) *Attorney, Agent, or Firm* — Patent Law Works LLP

(57) ABSTRACT

A technology for virtualized container opening and optimized item placement, and in an example includes a receiving, from an augmented reality device, a first image of user view capturing a storing surface of a storage space; receiving an input identifying a first item; retrieving item data associated with the first item based on the input; determining, from the one or more placement regions, a set of one or more viable placement regions for placing the first item on the storing surface based on an arrangement model and the item data associated with the first item; generating overlay placement data describing the set of one or more viable placement regions; transmitting the overlay placement data to the augmented reality device; and instructing the augmented reality device to superimpose one or more virtual items in the storage space in the user view based on the overlay placement data.

24 Claims, 16 Drawing Sheets

(56) References Cited

U.S. PATENT DOCUMENTS

| | | | | |
|---|---|---|---|---|
| 2007/0202472 | A1* | 8/2007 | Moritz | G06F 3/011 434/72 |
| 2012/0061338 | A1* | 3/2012 | Willick | G07F 17/0092 211/59.2 |
| 2014/0267723 | A1* | 9/2014 | Davidson, Jr. | H04N 7/183 348/147 |
| 2017/0091704 | A1* | 3/2017 | Wolf | G06Q 10/087 |
| 2018/0201445 | A1* | 7/2018 | Battles | B65G 1/1373 |

OTHER PUBLICATIONS

How to Safely Augment Reality: Challenges and Directions, Kiron Lebeck et al., 2016 ACM.*

Exploring a Multi-Sensor Picking Process in the Future Warehouse, Alexander Diete et al., UBICOMP/ISWC '16 Adjunct, Sep. 12-16, 2016, Heidelberg, Germany.*

Projective Windows: Arranging Windows in Space Using Projective Geometry, Joon Hyub Lee et al., UIST'17 Adjunct, Oct. 22-25, 2017, Québec City, Canada.*

Sukhov et al., "A dynamic programming heuristic for optimizing slot sizes in a warehouse," Procedia Computer Science, Information Technology and Quantitative Management, ITQM 2014 (5 pages).

Barry et al., "Warehouse Management System Benefits for Today's Operations," https://www.fcbco.com/blog/warehouse-management-system-benefits, 2018 (12 pages).

BAM Construct UK LTD, BAM trials Microsoft HoloLens—BAM News, (Nov. 4, 2016,) Retrieved Nov. 7, 2017, from http://www.bam.co.uk/media-centre/news-details/bam-trials-microsoft-hololens, 7 pages.

Charara, S. Microsoft HoloLens: Everything you need to know about the $3,000 AR headset (May 20, 2017). Retrieved Nov. 9, 2017, from https://www.wareable.com/ar/microsoft-hololens-everything-you-need-to-know-about-the-futuristic-ar-headset-735. 5 pages.

Arghavani et al., "3D Volumetric Pallet-Loading Optimisation," The International Journal of Advanced Manufacturing Technology, Nov. 1996, vol. 11, Issue 6 (2 pages).

Alonso et al., "Algorithms for Pallet Building and Truck Loading in an Interdepot Transportation Problem," Mathematical Problems in Engineering, 2016 (11 pages).

CubeMaster, Load Plan & Optimization Software, retrieved from http://www.logensol.com/cubemaster/Cargo_Load_Plan_Optimization_Software_overview/ Jul. 26, 2017 (4 pages).

CubeMaster, Palletizing and Packaging Design Software, retrieved from http://www.logensol.com/cubedesigner/Palletizing_Package_Design_Software_overview/ Jul. 26, 2017 (3 pages).

CubeMaster, Load Plan & Optimization Software, Algorithm Multiple Load Optimizations, retrieved from http://www.logensol.com/cubemaster/cargo_load_plan_optimization_software_algorithms/ Jul. 26, 2017 (3 pages).

Packer3D, The Packer3d software calculates optimal plans for loading different types of boxes, cylinders, and pallets into containers, trucks, and railroad freight cars, retrieved from http://www.packer3d.com/online/pal-by-box Jul. 26, 2017 (1 page).

PalletStacking, Pallet Optimization—Palletization Software, retrieved from http://www.palletstacking.com/ Jul. 26, 2017 (5 pages).

* cited by examiner

| Trial | SKU_Text | PLTDimX | PLTDimY | PLTDimZ | CaseDimX | CaseDimY | CaseDimZ | CasesX_Base | CasesY_Base | CasesBase |
|---|---|---|---|---|---|---|---|---|---|---|
| 1 A | 800836 | 48.0 | 40.0 | 60.0 | 17.00 | 14.00 | 4.00 | 2 | 2 | 4 |
| 2 B | 800836 | 48.0 | 40.0 | 60.0 | 17.00 | 4.00 | 14.00 | 2 | 10 | 20 |
| 3 C | 800836 | 48.0 | 40.0 | 60.0 | 14.00 | 17.00 | 4.00 | 3 | 2 | 6 |
| 4 D | 800836 | 48.0 | 40.0 | 60.0 | 14.00 | 4.00 | 17.00 | 3 | 10 | 30 |
| 5 E | 800836 | 48.0 | 40.0 | 60.0 | 4.00 | 17.00 | 14.00 | 12 | 2 | 24 |
| 6 F | 800836 | 48.0 | 40.0 | 60.0 | 4.00 | 14.00 | 17.00 | 12 | 2 | 24 |

Figure 7D

| Trial | SKU_Text | RemainingDim1 | RemainingDim2 | RemainingDim3 |
|---|---|---|---|---|
| 1 A | 800836 | 14.00 | 12.00 | 0.00 |
| 2 B | 800836 | 14.00 | 0.00 | 4.00 |
| 3 C | 800836 | 6.00 | 6.00 | 0.00 |
| 4 D | 800836 | 6.00 | 0.00 | 9.00 |
| 5 E | 800836 | 0.00 | 6.00 | 4.00 |
| 6 F | 800836 | 0.00 | 12.00 | 9.00 |

Figure 7E

| Trial | SubTrial | SKU_Text | RemDim1 | RemDim2 | RemDim3 | CaseDimX | CaseDimY | CaseDimZ | CasesX_Sub | CasesY_Sub | Layers2_Sub | Cases_Sub |
|---|---|---|---|---|---|---|---|---|---|---|---|---|
| A2 | Num1 | 800836 | 12.00 | 34.00 | 60.00 | 17.00 | 14.00 | 4.00 | 0 | 2 | 15 | 0 |
| A2 | Num2 | 800836 | 12.00 | 34.00 | 60.00 | 17.00 | 4.00 | 14.00 | 0 | 8 | 4 | 0 |
| A2 | Num3 | 800836 | 12.00 | 34.00 | 60.00 | 14.00 | 17.00 | 4.00 | 0 | 2 | 15 | 0 |
| A2 | Num4 | 800836 | 12.00 | 34.00 | 60.00 | 14.00 | 4.00 | 17.00 | 0 | 8 | 3 | 0 |
| A2 | Num5 | 800836 | 12.00 | 34.00 | 60.00 | 4.00 | 17.00 | 14.00 | 3 | 2 | 4 | 24 |
| A2 | Num6 | 800836 | 12.00 | 34.00 | 60.00 | 4.00 | 14.00 | 17.00 | 3 | 2 | 3 | 18 |
| B1 | Num1 | 800836 | 14.00 | 40.00 | 60.00 | 17.00 | 14.00 | 4.00 | 0 | 2 | 15 | 0 |
| B1 | Num2 | 800836 | 14.00 | 40.00 | 60.00 | 17.00 | 4.00 | 14.00 | 0 | 10 | 4 | 0 |
| B1 | Num3 | 800836 | 14.00 | 40.00 | 60.00 | 14.00 | 17.00 | 4.00 | 1 | 2 | 15 | 30 |
| B1 | Num4 | 800836 | 14.00 | 40.00 | 60.00 | 14.00 | 4.00 | 17.00 | 1 | 10 | 3 | 30 |
| B1 | Num5 | 800836 | 14.00 | 40.00 | 60.00 | 4.00 | 17.00 | 14.00 | 3 | 2 | 4 | 24 |
| B1 | Num6 | 800836 | 14.00 | 40.00 | 60.00 | 4.00 | 14.00 | 17.00 | 3 | 2 | 3 | 18 |
| B2 | Num1 | 800836 | 0.00 | 34.00 | 60.00 | 17.00 | 14.00 | 4.00 | 0 | 2 | 15 | 0 |
| B2 | Num2 | 800836 | 0.00 | 34.00 | 60.00 | 17.00 | 4.00 | 14.00 | 0 | 8 | 4 | 0 |
| B2 | Num3 | 800836 | 0.00 | 34.00 | 60.00 | 14.00 | 17.00 | 4.00 | 0 | 2 | 15 | 0 |

Figure 7F

| Trial | SKU_Text | CasesBase | CasesBaseWithLayers | Cases_MaxSub1 | Cases_MaxSub2 | FinalCases |
|---|---|---|---|---|---|---|
| A | 800836 | 4 | 60 | 30 | 24 | 114 |
| B | 800836 | 20 | 80 | 30 | 0 | 110 |
| C | 800836 | 6 | 90 | 8 | 9 | 107 |
| D | 800836 | 30 | 90 | 8 | 0 | 98 |
| E | 800836 | 24 | 96 | 0 | 9 | 105 |
| F | 800836 | 24 | 72 | 0 | 27 | 99 |

Figure 7G

DYNAMIC ITEM PLACEMENT USING 3-DIMENSIONAL OPTIMIZATION OF SPACE

BACKGROUND

The present disclosure relates to item handling systems.

In storage facilities, inventory movement is frequently performed. The task of inventory movement often requires placing inventory items in a storage space such as on pallets or in containers, inventory slots, etc. The conventional storage facilities generally rely on human workers to provide a random solution for how the items should be placed in the storage space. It is burdensome for the human workers to figure out an arrangement pattern to place the items and oftentimes such arrangement is not optimal. As a result, the storage space is not efficiently utilized and additional effort is unnecessarily required to complete the item placement task.

SUMMARY

According to one innovative aspect of the subject matter described in this disclosure, a system includes receiving, from an augmented reality device, a first image of user view capturing a storing surface of a storage space; retrieving an arrangement model associated with the storage space, the arrangement model describing one or more placement regions, each placement region reflecting a where an item is placeable in the storage space; receiving an input identifying a first item; retrieving item data associated with the first item based on the input; determining, from the one or more placement regions, a set of one or more viable placement regions for placing the first item on the storing surface based on the arrangement model and the item data associated with the first item; generating overlay placement data describing the set of one or more viable placement regions; transmitting the overlay placement data to the augmented reality device; and instructing the augmented reality device to superimpose one or more virtual items in the storage space in the user view based on the overlay placement data.

In general, another innovative aspect of the subject matter described in this disclosure may be embodied in a method comprising receiving, from an augmented reality device, a first image of user view capturing a first portion of a container; retrieving a container data associated with the container; detecting an opening line on the first portion of the container; responsive to detecting the opening line, generating overlay opening instruction data describing an opening instruction to open the container using the opening line; transmitting the overlay opening instruction data to the augmented reality device; and instructing the augmented reality device to superimpose the opening instruction on the first portion of the container in the user view based on the overlay opening instruction data.

Other embodiments of one or more of these aspects include corresponding systems, apparatus, and computer programs, configured to perform the actions of the methods, encoded on computer storage devices. For example, a system may comprise one or more memories storing instructions encoding the operations of the methods disclosed herein. The system may further comprise one or more computer processors that execute the instructions to perform the operations.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

The technology presented in this disclosure addresses the problems discussed in the Background Section. For example, the technology described herein optimizes storage areas (called storage space(s)) in the storage facility in an efficient and flexible manner. In particular, the present technology may calculate optimal stacking models (called arrangement models) for stacking items on one or more storing surfaces of a storage space, which may include pallets, designated floor space, shelf space, totes, slots, cartons, containers, etc.

The present technology can also facilitate the human workers in completing their tasks by preparing providing virtualized stacking instructions to mobile devices accompanying the workers. In a typical use case, a user may be wearing an augmented reality device and the placement instructions may be dynamically superimposed in the user view displayed by the device, as discussed in further detail herein. These embodiments are particularly advantageous because it eliminates the need for the human worker to make manual determinations on how best to stack items to save space while providing a safe configuration that is not likely to fall over. The present technology is also applicable to automated storage facilities in which the tasks of stocking items are performed by automated vehicles, e.g., warehouse robotic machines.

Figure 1:
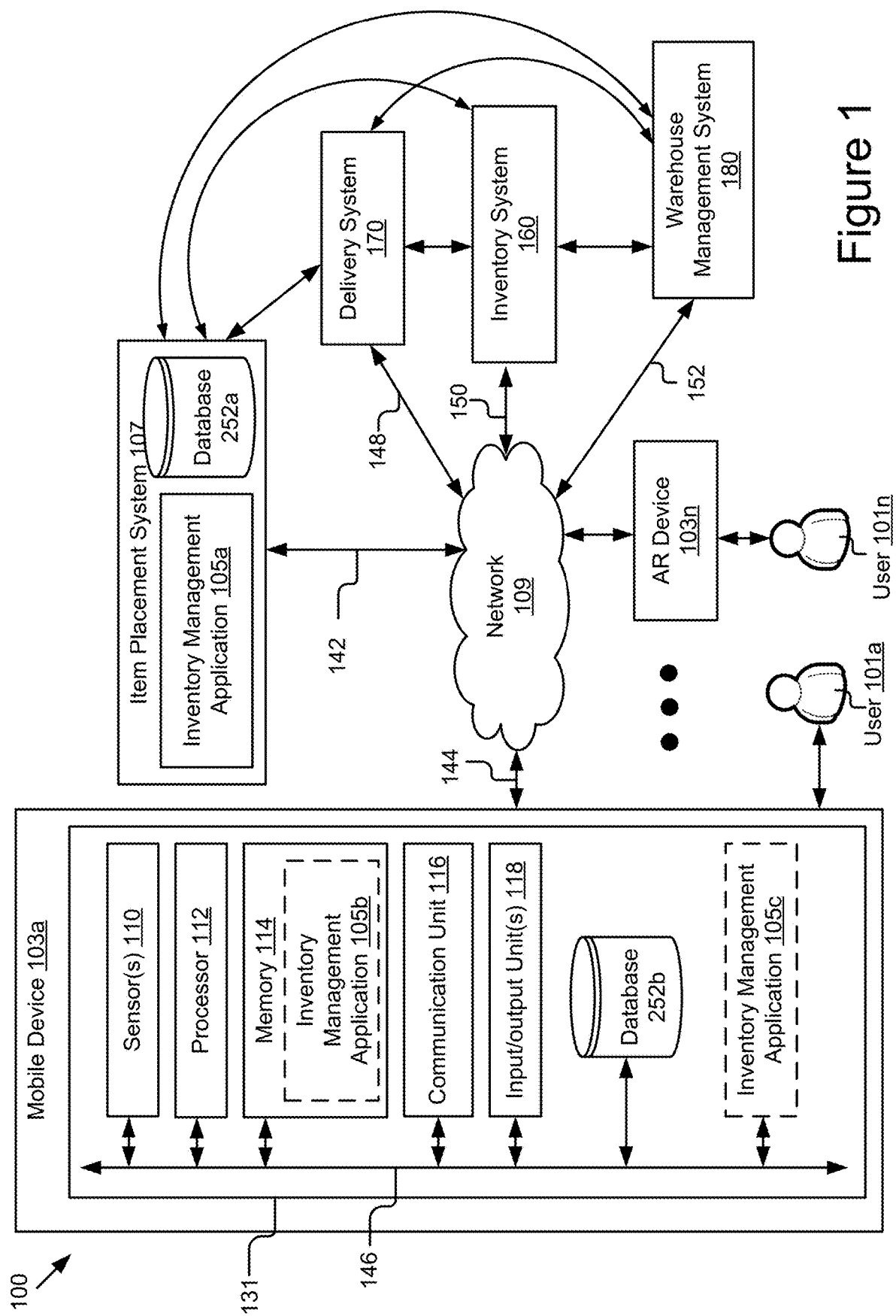
FIG. 1 is a block diagram of an example system for virtualized placement of items and virtualized container opening.

FIG. 1 is a block diagram of an example system 100 for container and item management. As shown, the system 100 includes a warehouse management system 180, an inventory system 160, delivery system 170, and one or more mobile device 103*a* . . . 103*n*, coupled for electronic communication via a network 109. It should be understood that the system 100 depicted in FIG. 1 is provided by way of example and the system 100 and/or further systems contemplated by the present disclosure may include additional and/or fewer components, may combine components and/or divide one or more of the components into additional components, etc. For example, the system 100 may include any number of delivery systems 170, warehouse management systems 180, inventory systems 160, item placement systems 107, or mobile device(s) 103.

The network 109 can be a conventional type, wired or wireless, and may have numerous different configurations including a star configuration, token ring configuration, or other configurations. Furthermore, the network 109 may include one or more local area networks (LAN), wide area networks (WAN) (e.g., the Internet), cellular networks, public networks, private networks, virtual networks, virtual private networks, peer-to-peer networks, close or micro proximity networks (e.g., Bluetooth, NFC, etc.), and/or other interconnected data paths across which multiple devices may communicate.

The network 109 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 109 is a wireless network using a connection such as DSRC (Dedicated Short Range Communication), WAVE, 802.11p, a 3G, 4G, 5G+ network, WiFi™, satellite networks, or other suitable networks. Although FIG. 1 illustrates a single block for the network 109 that couples to the delivery system(s) 170, the warehouse management system(s) 180, the inventory system(s) 160, the item placement system(s) 107, the mobile device(s) 103, and/or other components, it should be understood that the network 109 may in practice comprise any number of combination of networks, as noted above.

The delivery system 170 may include hardware and/or virtual server(s) that includes processor(s), memory(ies), and network communication capabilities (e.g., communication unit(s)). The delivery system 170 may be communicatively coupled to the network 109, as reflected by signal line 148. In some embodiments, the delivery system 170 may send and receive data to and from one or more warehouse management systems 109 and/or any other components of the system 100. For example, the delivery system 170 may receive purchase orders of inventory from the warehouse management system 180, and dispatch trucks and/or other shipping vehicles with the ordered goods to a storage facility managed by the item placement system 107 and warehouse management system 180. In another example, the delivery system 170 may send invitation(s) for delivery appointment to the warehouse management system 180 to schedule an appointment for delivering the ordered inventory, and dispatch trucks and/or other shipping vehicles for receiving the requested goods to a storage facility managed by the item placement system 107 and warehouse management system 180.

The warehouse management system (WMS) 180 can manage a variety of tasks to support and/or control operations of a storage facility. In some embodiments, the WMS 180 may include a hardware and/or virtual server that includes processor(s), memory(ies), and network communication capabilities (e.g., communication unit(s)). The WMS 180 may be communicatively coupled to the network 109, as reflected by signal line 152. In some embodiments, the WMS 180 may send and receive data to and from other components of the system 100. For example, the WMS 180 may keep track of the inventory level(s) of various item(s) (e.g., stock keeping units (SKUs)) and send order(s) to the delivery system 170 when the inventory level(s) are low. In another example, the WMS 180 may receive order confirmation(s) of the purchase order(s) and the invitation for delivery appointment from the delivery system 170. The WMS 180 may send the information of delivery appointment(s) to the inventory system 160 to prepare in advance storage space(s) and opening instructions for the items when delivered. In some embodiments, the WMS 180 may generate statistics of inventory level and prediction of demand for various inventory items stored in the storage facility.

The item placement system 107 may comprise include hardware and/or virtual server(s) that includes processor(s), memory(ies), and network communication capabilities (e.g., communication unit(s)), and instances of the inventory management application 105 deployed in the field (e.g., on mobile devices 103), that are configured to provide virtualized instructional guidance for opening item containers and placing items efficiently in storage spaces.

The mobile device(s) 103, as mobile device 103*a* and AR device 103*n*, are computing device(s) that includes one or more sensors, a memory, a processor, and a communication unit. A mobile device 103 may be coupled to the network 109, as reflected by signal line 118, to send and receive data to and from the item placement system 107, the warehouse management system 180, the inventory system 160, and/or any other components of the system 100. Non-limiting examples of the mobile device 103 include alternate and/or augmented reality devices (e.g., Microsoft HoloLens™ Google Glass™, Oculus™, etc.), mobile phones, personal digital assistants (PDA), barcode scanners, laptop computers, a desktop computers, a tablet computers, a holographic computers, any combination of the foregoing, and/or any other electronic devices capable of displaying data, capturing and/or entering input data, and providing the input data to other components of the system 100.

The users 101*a* . . . 101*n*, such as a human worker, can interact with the mobile device 103 to enter the input data and/or receiving assistance information. For instance, a human worker can wear a wearable augmented reality device, such as a Microsoft HoloLens™, which may overlay information about inventory and may receive input via input devices, such as a hardware button, an optical sensor (e.g., camera, etc.). The mobile device 103 may capture inputs such as keyboarding and/or pointer device inputs, gestures, voice commands, etc. Examples of the input data include, but are not limited to a storage space, container, or item (e.g., product) identifier (e.g., obtained by scanning a visual representation (e.g., barcode)), etc. The system 100 can include any number or types of assistance devices 127.

The inventory system 160 can manage the storage of inventory items in various storage locations (having storage spaces) of the storage facility. In some embodiments, the inventory system 160 may include computing device(s) that have a an inventory application, processor(s), memory(ies), communication unit(s), and data store(s). The inventory system 160 may be coupled to the network 109 via signal line 150, and may send and receive data to and from the item placement system 107, the WMS 180, the delivery system 160, the mobile device 103, and/or any other components of the system 100.

The sensor(s) 110 include any suitable devices configured to collect any type of signal data suitable to determine characteristics of a mobile device 103 and/or its internal and external environments. Non-limiting examples of the sensor(s) 109 include various optical sensors (CCD, CMOS, 2D, 3D, light detection and ranging (LIDAR), cameras, etc.), audio sensors, motion detection sensors, barometers, altimeters, thermocouples, IR sensors, other photo sensors, gyroscopes, accelerometers, geo-location sensors, orientation sensor, wireless transceivers, touch sensors, proximity sensors, distance sensors, etc. In some embodiments, one or more sensors 110 may include sensors situated to capture the environment being viewed by the user.

A processor 112 may execute software instructions by performing various input, logical, and/or mathematical operations. A processor 112 may have various computing architectures to method data signals including, for example, a complex instruction set computer (CISC) architecture, a reduced instruction set computer (RISC) architecture, and/or an architecture implementing a combination of instruction sets. A processor 112, which may include one or more processors, may be physical and/or virtual, and may include a single core or plurality of processing units and/or cores. In some embodiments, a processor 112 may execute instructions comprising aspects of the inventory management application 105, as discussed elsewhere herein. In some embodiments, a processor 112 may be coupled to the memory 114 via the bus 146 to access data and instructions therefrom and store data therein. The bus 146 may couple the processor 112 to the other components of the mobile device 103 including, for example, the inventory management application 105, the memory 114, the communication unit 116, and the database 252.

The memory 114 may store and provide access to data to the other components of the mobile device 103. The memory 114 may be included in a single computing device or a plurality of computing devices. In some embodiments, the memory 114 may store instructions and/or data that may be executed by the processor 112. For example, the memory 114 may store an instance of the inventory management application 105 and/or its respective components, depending on the configuration. The memory 114 is also capable of storing other instructions and data, including, for example, an operating system, hardware drivers, other software applications, databases, etc. The memory 114 may be coupled to the bus 146 for communication with the processor 112 and the other components of mobile device 103.

The memory 114 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 112. In some embodiments, the memory 114 may include one or more of volatile memory and non-volatile memory (e.g., RAM, ROM, hard disk, optical disk, etc.). It should be understood that the memory 114 may be a single device or may include multiple types of devices and configurations.

The bus 146 can include a communication bus for transferring data between components of a computing device or between computing devices, a network bus system including a network or portions thereof, a processor mesh, a combination thereof, etc. In some embodiments, various other components operating on the mobile device 103 (operating systems, device drivers, etc.) may cooperate and communicate via a communication mechanism included in or implemented in association with the bus 146. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 116 may include one or more interface devices (I/F) for wired and wireless connectivity among the components the system 100. For example, the communication unit 116 may include, but is not limited to, various types known connectivity and interface options. The communication unit 116 may be coupled to the other components of the mobile device 103 via the bus 146. The communication unit 116 may be coupled to the network 109, as reflected by the signal line 112, depending on the configuration. In some embodiments, the communication unit 116 can link the processor 112 to a network (e.g., the Internet, an intranet, etc.), which may in turn be coupled to other processing systems. The communication unit 116 can provide other connections to a network and to servers or computing devices using various standard communication protocols.

Database(s) 252 (252a . . . 252n) include one or more non-transitory storage media that store various types of data and provides access to the data. The data stored by a database 252 may be organized and queried using various criteria. For example, the database 252 may include data tables, databases, file systems, or other organized collections of data. In some embodiments, the database 252 may be included in the mobile device 103 or in another computing system and/or storage system distinct from but coupled to or accessible by the mobile device 103. In some embodiments, the database 252 may be incorporated with the memory 114 or may be distinct therefrom. In some embodiments, the database 252 may store data associated with a database management system (DBMS) operable on the mobile device 103. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the database 252 may include, but is not limited to, item data, storage space data, image data, container data, opening data, arrangement models, stacking states, etc. In some embodiments, the item data may include information describing inventory items. In some embodiments, each inventory item, storage space, container, etc., data may include an identifier (ID) uniquely identifying the object (e.g., barcode, product Quick Respond (QR) code, etc.). Further types of data stored by the database(s) 252 are discussed elsewhere herein.

The inventory management application 105 is computer logic executable to manage item placement and opening of item containers. In some embodiments, the inventory management application 105 can be implemented using software executable by one or more processors of one or more computer devices, using hardware (e.g., as reflected by inventory management application instance 105c), such as but not limited to a field-programmable gate array (FPGA), an application-specific integrated circuit (ASIC), etc., and/or a combination of hardware and software, etc. The inventory management application 105 may receive and process scan data, input data, images, etc., communicate with other elements of the mobile device 103 via the bus 146, and communicate with other components of the system 100 via the network 109. The inventory management application 105 is described in details below with reference to at least FIGS. 2-10.

It should be understood that the acts and/or functionalities of the inventory management application 105 can be implemented on a single computing device, implemented on a cluster of computing devices, or can be distributed between multiple computing devices, including within a cloud-based computing environment in which the functionality of the inventory management application 105 is provided as a service over a network 107.

Figure 2:
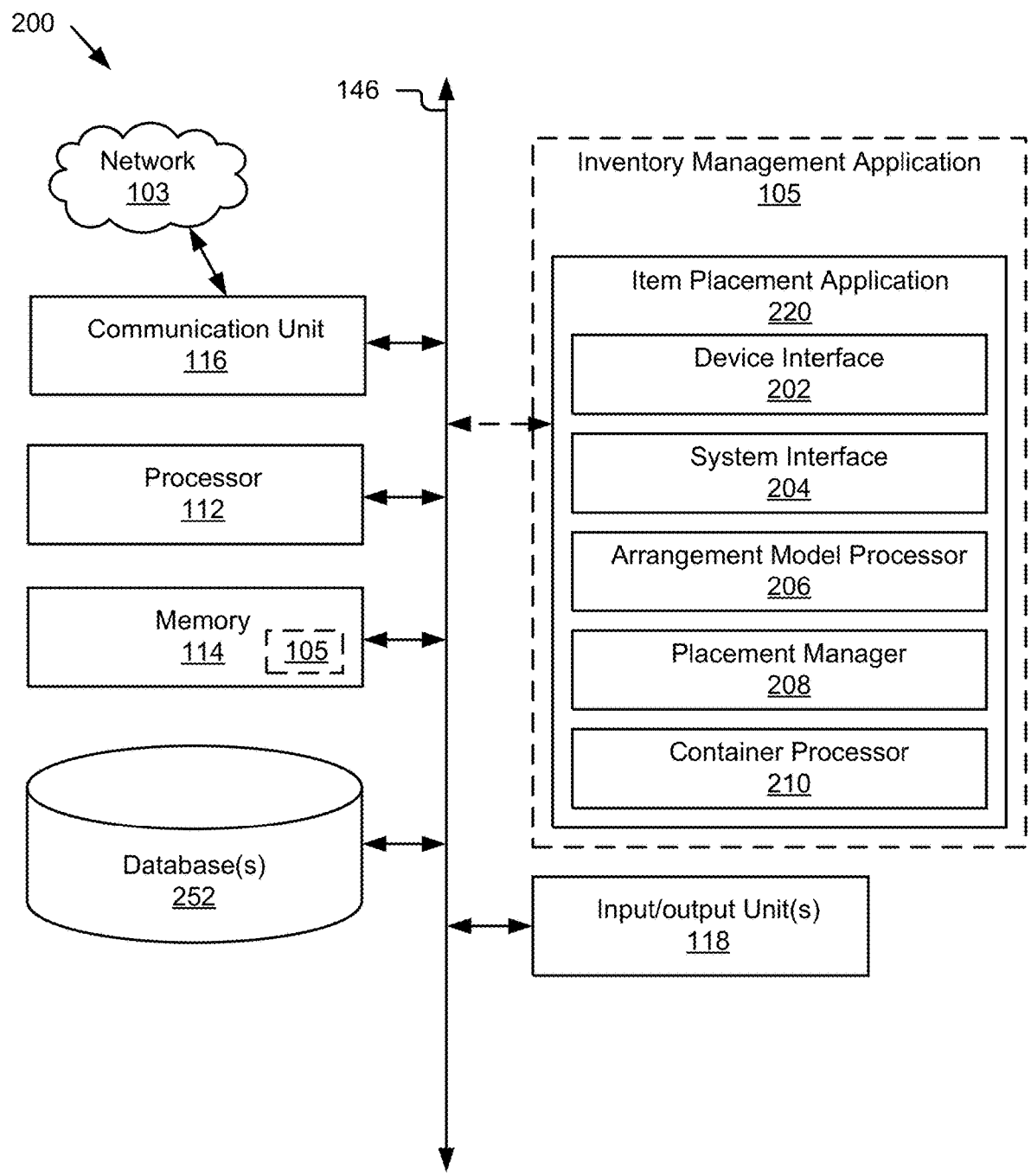
FIG. 2 is a block diagram of an example computing system.
Figure 3A:
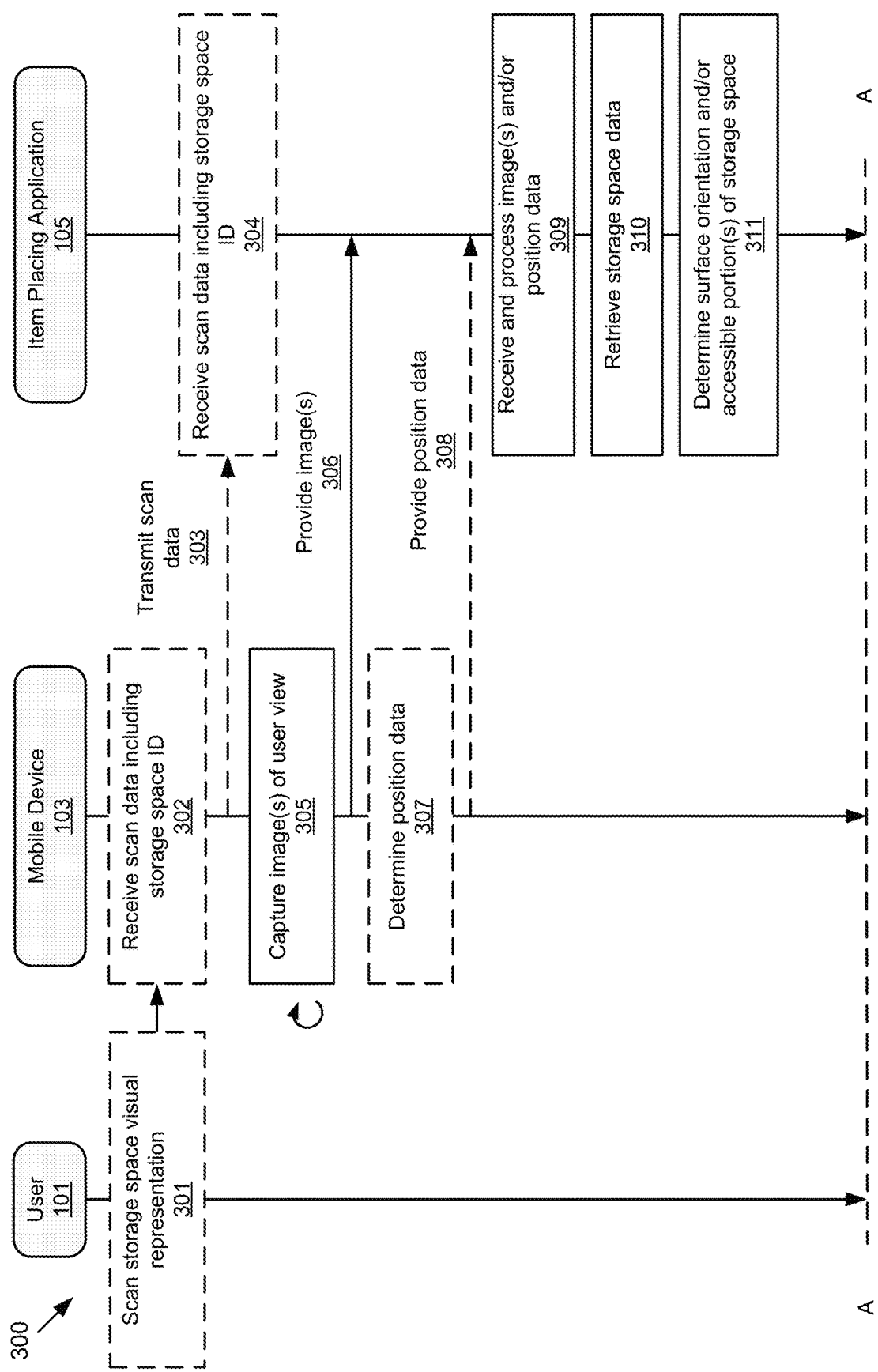
FIGS. 3A-3D are flowcharts of an example method for providing digital, instructive stacking guidance to a user.
Figure 3B:
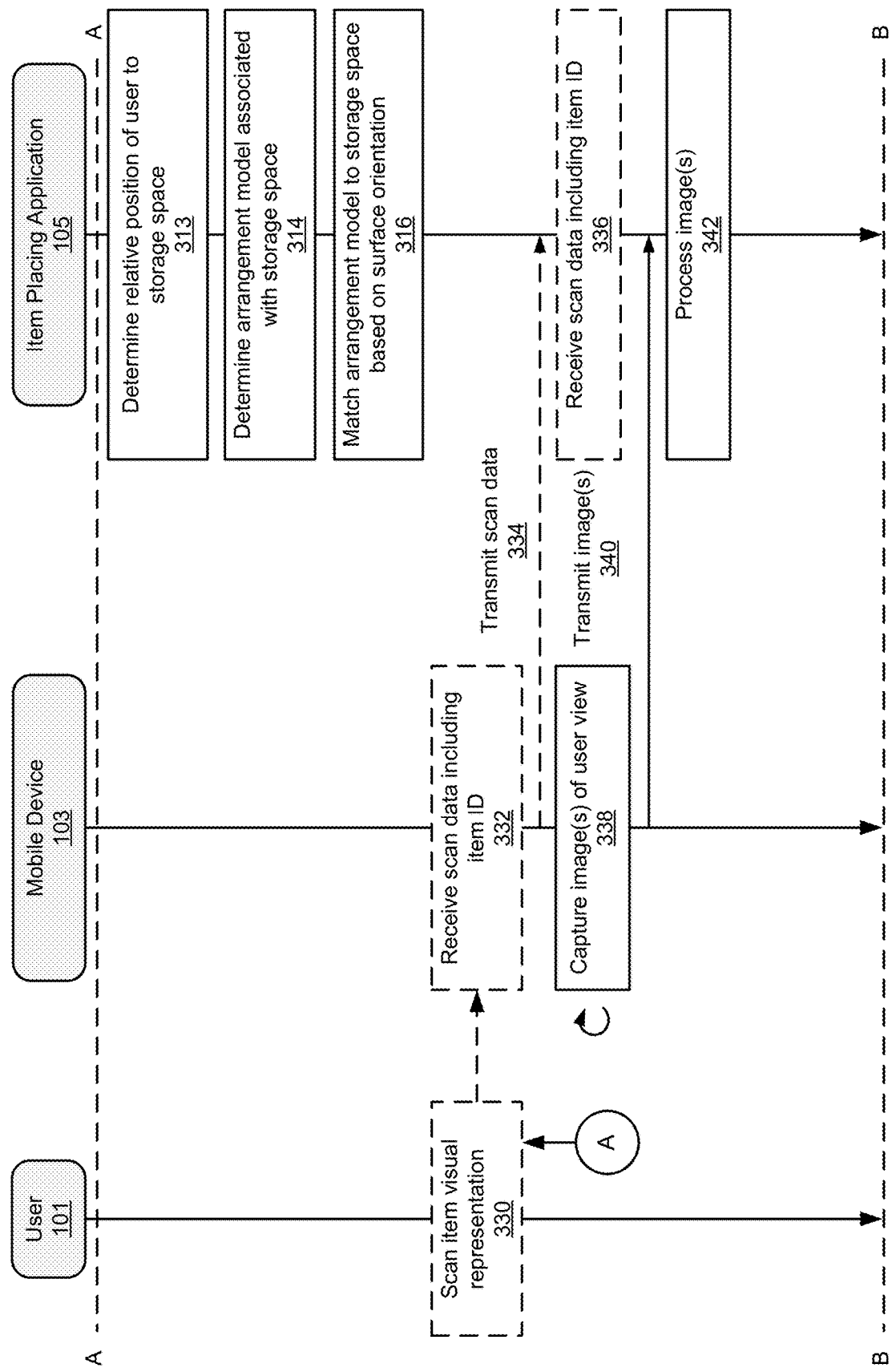
Figure 3C:
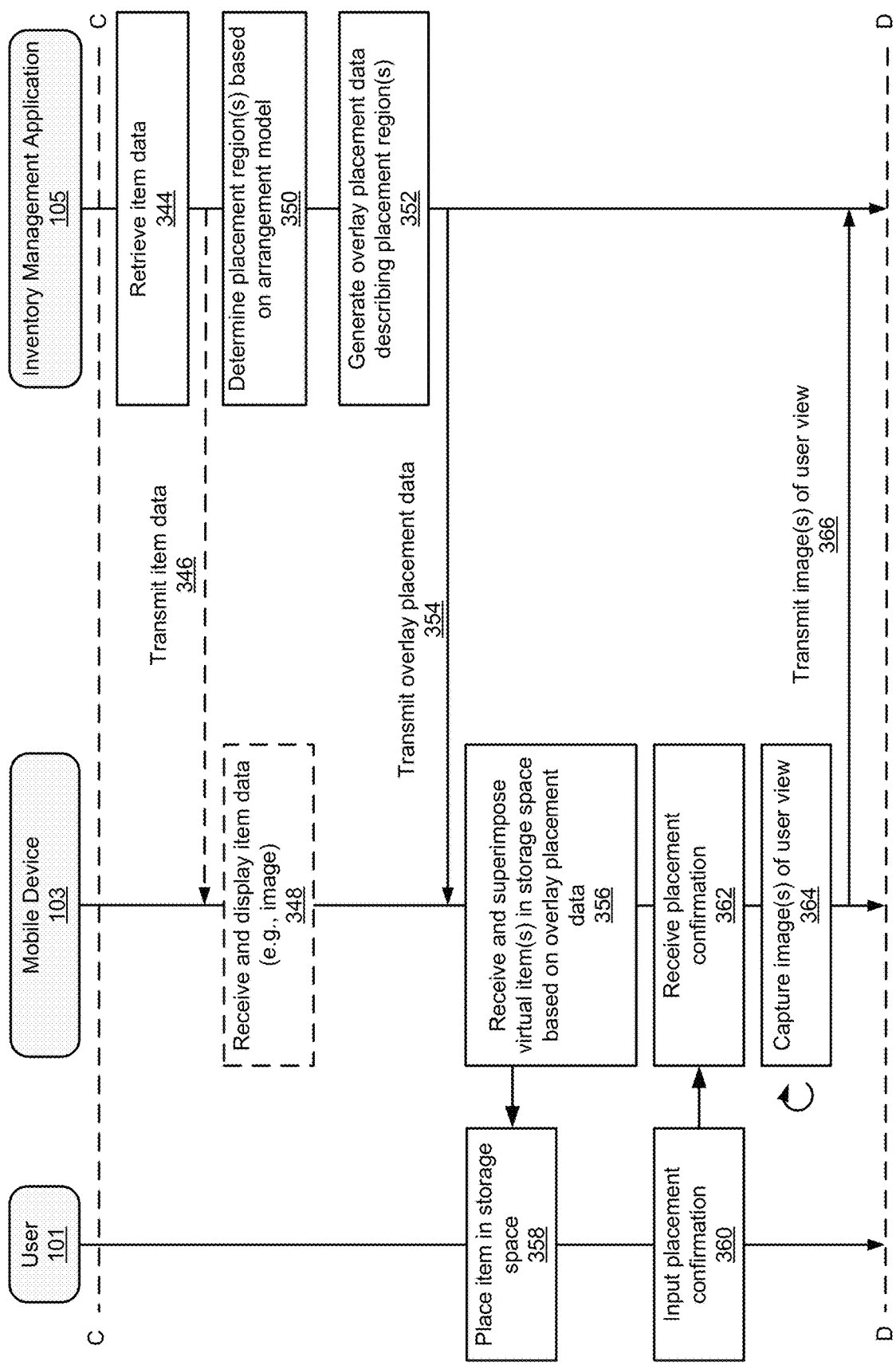
Figure 3D:
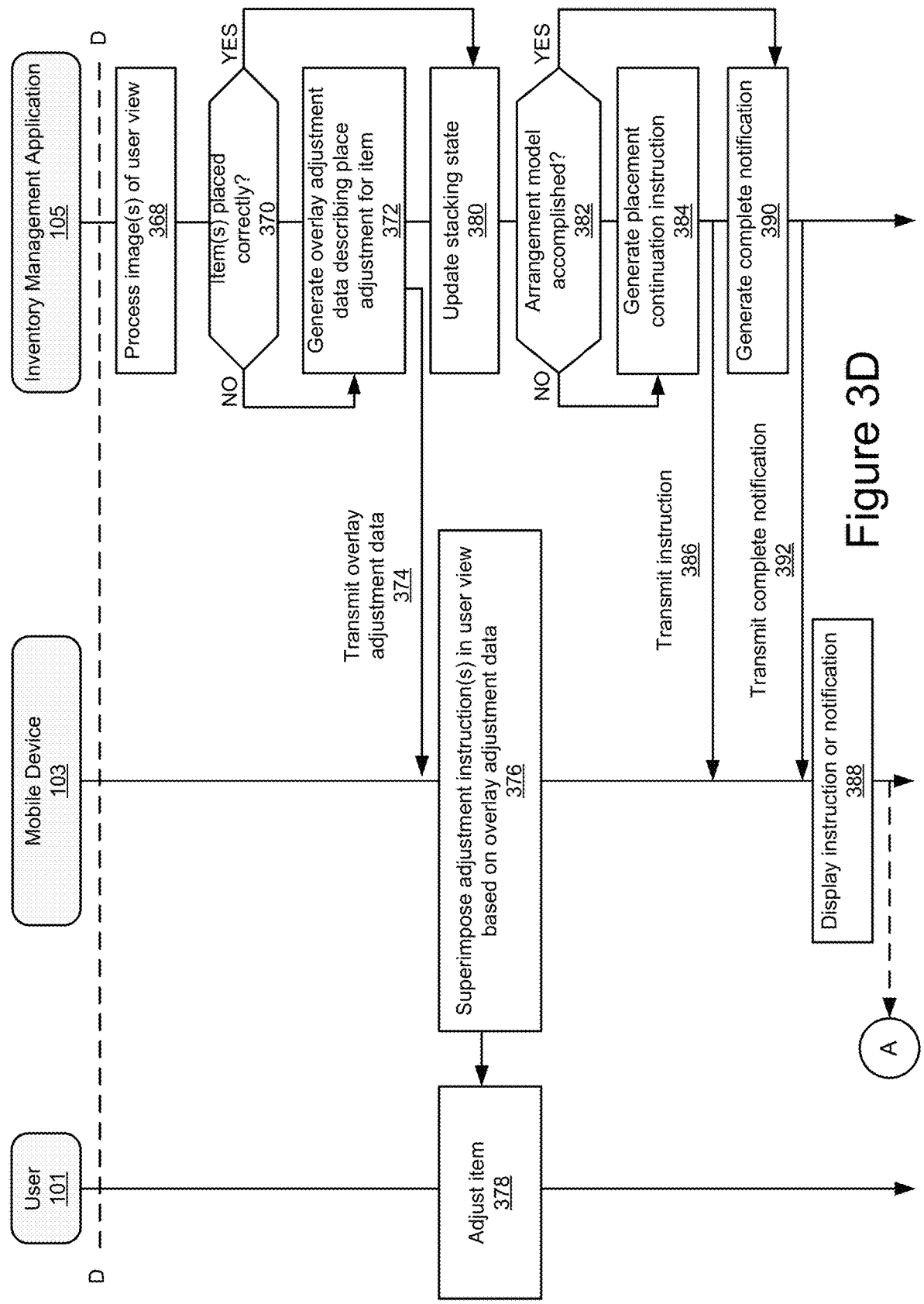

FIG. 2 is a block diagram illustrating an example computing system 200. The example computing system 200 may represent computing devices of systems for any of the components of the system 100, such as a mobile device 103, an item placement system 107, a delivery system 170, an inventory system 160, a warehouse management system 180, etc.

As depicted, the computing system 200 may include a processor 112, a memory (which may store an instance of the inventory management application 105), a communication unit 116, which may be coupled to the network 103, and one or more input and/or output unit(s), such as pointer devices, touch-sensitive devices, display screens (e.g., LED, LCD, projection, electronic glass, etc. displays), buttons, keyboards, cameras, microphones, speakers, geolocation sensors, accelerometers, gyroscopes, compasses, and/or any other suitable devices, including the sensors 110 described in FIG. 1.

The sensor(s) 109 may be configured to collect any type of signal data suitable to determine characteristics of a platform 112 and/or its internal and external environments. Non-limiting examples of the sensor(s) 109 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, orientation sensor, wireless transceivers, sonar sensors, ultrasonic sensors, touch sensors, proximity sensors, distance sensors, etc. In some embodiments, <one or more sensors 109 may include externally facing sensors provided at the front side, rear side, right side, and/or left side of the responsive platform 107 in order to capture the situational context surrounding the responsive platform 107.

The depicted components may be coupled by an instance of the communication bus 146 described above. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. Although, for purposes of clarity, FIG. 2 only shows a single processor 116, memory 114, communication unit 116, etc., it should be understood that these blocks represent one or more of their respective component types.

As depicted, an instance of the inventory management application 105 may include a device interface 202, a system interface 204, a arrangement model processor 206, a placement manager 208, and/or a container processor 210. It should be understood that the inventory management application 105 may include additional or fewer components.

The inventory placement application 220 and/or its components, such as the device interface 202, the system interface 204, the arrangement model processor 206, the placement manager 208, and/or the container processor 210, may comprise computer logic (e.g., software, routines, etc.) executable by the processor 112 to provide the functionality describe herein in reference to those components.

The inventory placement application 220 and/or its components may be implemented as software, hardware, or a combination of the foregoing. In some embodiments, the device interface 202, the system interface 204, the arrangement model processor 206, the placement manager 208, and/or the container processor 210 may be communicatively coupled by the bus 146 and/or the processor 112 to one another and/or the other components of the mobile device 103. In some embodiments, the device interface 202, the system interface 204, the arrangement model processor 206, the placement manager 208, and/or the container processor 210 are sets of instructions executable by the processor 112 to provide their functionality. In further embodiments, the device interface 202, the system interface 204, the arrangement model processor 206, the placement manager 208, and/or the container processor 210 are storable in the memory 114 and are accessible and executable by the processor 112 to provide their functionality. In any of the foregoing embodiments, the inventory placement application 220, the device interface 202, the system interface 204, the arrangement model processor 206, the placement manager 208, and/or the container processor 210 may be adapted for cooperation and communication with the processor 112 and other components of the mobile device 103. The inventory management application 105 and its components are described in further detail below with reference to at least FIGS. 3-10.

By way of example and not limitation, the inventory management application 105 can provide and/or facilitate receiving and/or put-away processes on the inbound side, and shipping on the outbound side of a warehouse/distribution facility. In some cases, the inventory management application 105 can provide a user access to additional information on stacking state, arrangement (e.g., 3D cubing), and/or orientation that was previously unavailable.

For instance, a warehouse associate may receive cartons of product on the docks that need to palletized. This may be inbound on receiving docks or outbound on shipping docks. The associate logs into their augmented reality device (e.g., HoloLens™) and launches the instance of the inventory management application 105 on their device. Using the sensor(s) of the device, the associate can scan a label (e.g., barcode, carton size code, etc.) on the inbound carton that uniquely identifies the product or the carton size.

In some cases, the user can input any additional/necessary information into the inventory management application 106, such as but not limited to the number of cartons of items received.

The inventory management application 105 can generate and/or retrieve the arrangement model for the pallet, and provide virtual instructional guidance to the user for optimally stacking the pallet. For example, the instance of the inventory management application 105 running on the user's augmented reality device can present an enhanced interface displaying image(s) of the item and/or instructional image(s) prompting the user to place the cartons on the pallet in the correct orientation that will result in optimal utilization of the pallet. Once the pallet is built, the user can Once the pallet is built, the user may receive instructions from the warehouse management system 180 to put away the pallet in the correct location in the warehouse/distribution facility.

FIGS. 3A-3D are signal diagrams illustrating an example method 300 for providing digital, instructive stacking guidance to a user. The stacking guidance is provided to a user via a mobile device accompanying the user. In a typical implementation of the method 300, the user works in an item fulfillment environment, such as a distribution center, a warehouse, an inventory storage location, the staging area, or other similar environment in which items are being organized, and the user is tasked with stacking items in a storage space.

A storage space is an area in which the set of items are stored. A storage space may comprise one or more storing surfaces and may be two or three dimensional in shape. A storage space may have one or more storing surfaces, also called bearing surfaces, on which items may be placed, and one or more surfaces that provide structure, support, protection, aesthetics, etc. The bearing surface of a storage space, when viewed from above, may have any shape that is suitable, such as a square shape, a round or oval shape, a polygonal shape, a complex shape, or combination of shapes, etc.

For example, a storage space may comprise a pallet, cubby, carton, designated shelf space, or other suitable compartment or surface in which items can be placed. A storage space may include one or more storing surfaces on which items are stacked. Stacking an item in the storage space includes placing the item on an empty region of a storing surface of the storage space, or placing the item on top of another item already on a storage surface of the storage space.

The top surface of an item placed in the storage space, or an empty surface comprising at least a portion of the storage space itself, may both be considered a storing surface of the storage space, provided an item can be placed on it/borne by it. As such, as items are placed in a storage space, the available storing/bearing surface(s) that can store/bear further items also change. Stacking an item may also include abutting the item against one or more vertical surfaces of the storing surface, which may be formed by adjacent items, walls of the storing surface, etc.

To maximize the number of items that can be stored in a storage space, the item placement application 220 can compute an optimal stacking arrangement for the set of items, and step-by-step virtual guidance may be provided to the user to instruct the user on how to place each item in the storage space.

Figure 8A:
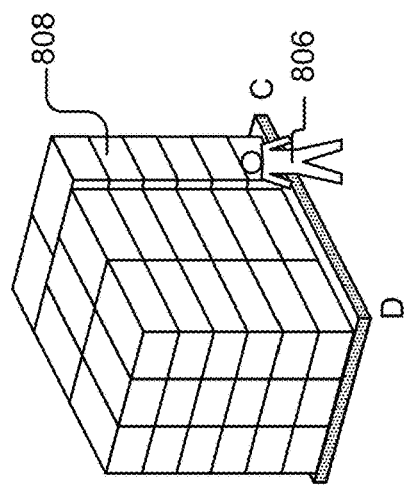
FIGS. 8A-8E depict various example scenarios for storing items on storing surface(s) of a storage space.
Figure 8B:
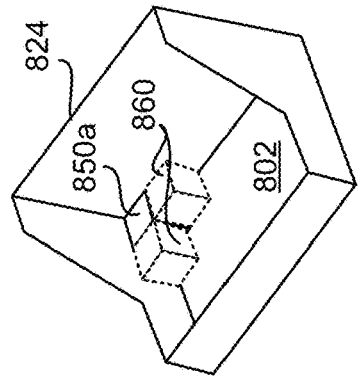

FIGS. 8A-8E depict various example scenarios for storing items on storing surface(s) of a storage space. In FIG. 8A, a plan view of an example storing surface 802 of a storage space is depicted having a set of items 800, which are depicted as shaded, stacked on it. The stacking sequence for the items 800 may be computed by the arrangement model processor 206 as discussed elsewhere herein. One or more sides of the of the storage space may be accessible to place items on the storing surface 802. For example, a user may be required to place items in the storage space from a particular location, or as the bearing surface(s) of the storing surface evolves due to the stacking of items, the place from which the user can stack the next item might change.

Figure 8C:
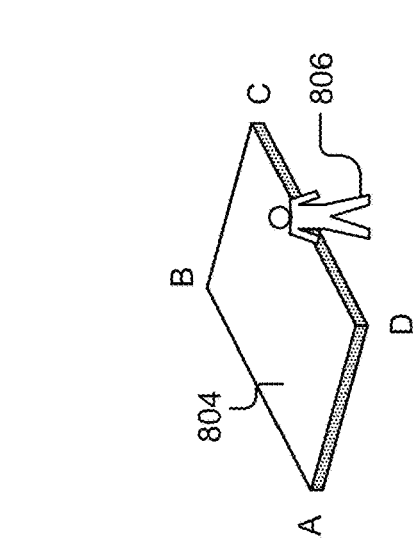

For example, if a user is stacking boxes on a pallet, such as a pallet depicted in FIG. 8C, the height of the bearing surface increases as additional boxes are stacked in the user may not be able to reach an opposing side of the stack of boxes in which the next box needs to be stacked, and as a result the user may need to walk around the pallet to stack the next box there. However, it should be noted that stacking sequence that may be computed by the item placement application 220 may account for the sides of the storage space that are accessible and optimize the stacking routine such that the amount of walking or repositioning may be minimized. This is advantageous as it can preserve the amount of energy needed to successfully place items on a storage surface, and minimize the amount of time required to complete the stacking task. For example, the virtualized guidance provided to the user 806 in FIGS. 8B and 8C instructing the user 806 to stack the items 800 in a particular sequence to achieve the stack 808 depicted in FIG. 8C, may minimize the amount of walking the user is required to do in order to stack the items as shown.

Figure 8D:
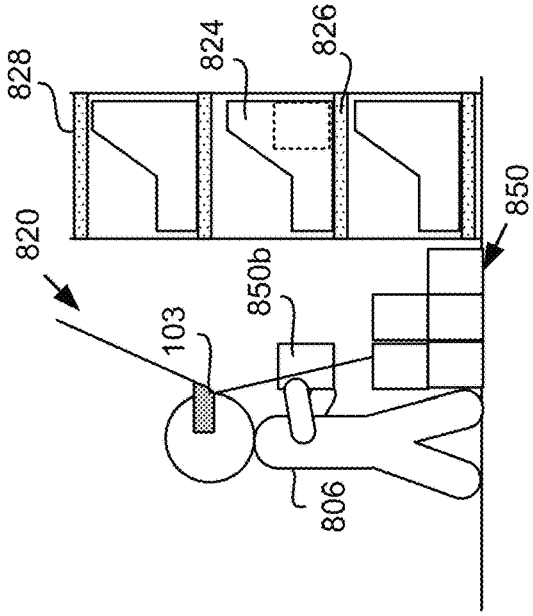
Figure 8E:
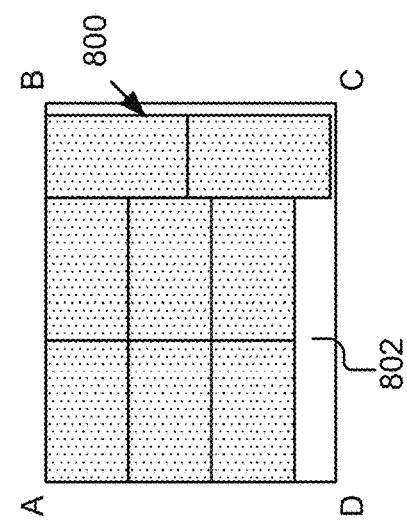
Figure 8F:
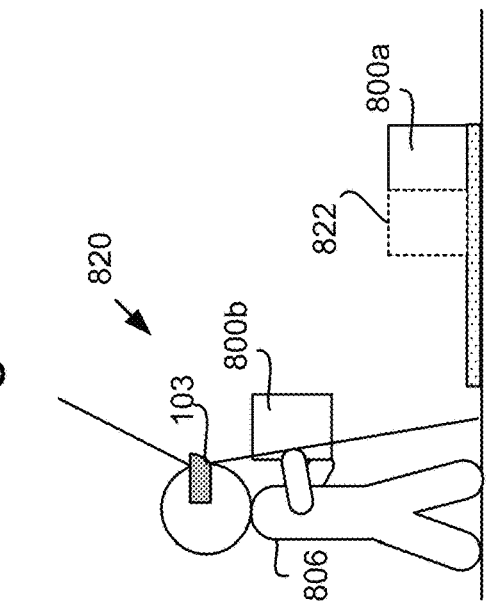

A mobile device 103 accompanying a user presents the virtualized guidance to the user. For example, in a typical embodiment such as that depicted in FIGS. 8D-8F, the mobile device 103 may comprise a virtual or augmented reality device that is wearable by the user in front of or over the eyes. This electronic eyewear includes output device(s) that output the virtualized instructions to the user 806. The output device(s) may comprise auditory, visual, and/or tactile devices that communicate instructions to the user 806. For instance, the mobile device 103 may comprise a augmented reality wearable device that includes an electronic display situated and/or projected in front of the user's eyes such that visual graphics may be presented within the user's 806 field-of-view 820. This allows the visual graphics to be overlaid with the environment facing the user 806. For example, as shown in FIG. 8D, a graphical overlay 822 may be depicted by the display of the augmented reality wearable device in the location where the item 800b is to be placed by the user 806. This advantageously clearly communicates to the user 806 the next location in which the next item in the sequence (e.g., 800b) should be placed.

In a further embodiment, the storage space may comprise a storage tote 824 that is placed on a shelf 826 of a storage rack 828. The user 806 may be situated in front of the storage rack 828, maybe receiving virtual instructions on how to replenish the inventory of the tote 824. For example, the user 806 may be placing a new shipment of items 820 into the tote 824. In this example, the user 806 has already stacked item 850a into the tote 824, and is in the process of stacking item 850b. The instance of the inventory management application 105b operating on the mobile device 103 is tracking the progress of the stacking and displaying instructional guidance to the user 806 on where the next item 850b is to be placed. For example, graphical information 860 may be displayed on a display of the mobile device 103 showing the user 806 the location(s) where the item 850b can be placed. For instance, a graphical target, such as solid or semitransparent graphical overlay(s) (e.g., a circle, square, shading, arrow, image representation of the item, a shape corresponding to the footprint of the item, etc., may be displayed on the display such that they appear to the user to be in the location(s) where the user can stack the item 850*b*.

Returning to FIG. 3A, in block 301, the user can request to scan a visual representation of the storage space, and in block 302, the mobile device 103, such as a wearable device (e.g., augmented or alternative reality device, etc.) can receive scan data including a storage space identifier (ID) and transmit the scan data in operation 303 to the item placing application 105, which may receive and process the scan data including the storage space ID in block 304. In some embodiments, the item placing application 220 may receive, from an augmented reality device, an image of the user view capturing storing surface(s) of the storage space. For instance, the user can trigger the scanning of the visual representation by providing input to a sensor 110 (e.g., tap a button, issue a voice command to a microphone of the mobile device 103, nod their head (activating a motion sensor of the mobile device 103) (e.g., accelerometer, gyroscope, etc.), make a hand gesture in the field of view of the camera of the mobile device 103, etc.).

In some embodiments, one or more images of the storage space may be captured and provided to the item placing application 105, as shown by reference numbers 305 and 306. For instance, the mobile device 103 may, in response to the input or automatically, capture the image, or may be capturing an image stream, such as a video stream, and may provide the video stream and/or extract frame(s) for provision to the item placing application 105.

Other variations for receiving the input and/or capturing the image are also possible and contemplated. In some embodiments, the scanning of a storage space ID may be automatically processed from sensor data captured of the environment by the mobile device 103. For example, a camera of the mobile device 103, such as an augmented reality device, may be sequentially capturing images of the environment in block 305. In some cases, the field-of-view of the camera may coincide with the user's field-of-view, and the images may reflect the environment as the user sees it. As such, the images may reflect objects within the environment, such as objects the user may be looking at. One such object may be the storage space, as defined by its surfaces (e.g., storing surface(s), sides, structure, etc). A surface of the storage space, such as a storing surface, or surface proximate a storing surface, may bear a detectable mark (e.g., bar code, QR code, etc.).

In operation 306, the device interface 202 may provide (e.g., transmit, communicate, etc.) the image(s) (e.g., video stream, image, series of images, etc.) data to the system interface 204, which may store the image(s) in the database(s) 252, and/or the provide the image(s) to the placement manager 208 for processing.

In some embodiments, the method 300 may comprise block 307, in which sensor(s) of the mobile device 103 may determine position data reflecting the physical position of the mobile device. Position data may describe the geolocation of the mobile device (e.g., global (e.g., GPS) coordinates or the like, beacon-determined position within a known physical space, etc.), an orientation of the mobile device (e.g., compass bearings), the attitude of the mobile device 103 (e.g., pitch, roll and yaw (azimuth) angles relative to the normal horizon, etc. (e.g., which can be used to determine if the user is looking upward, straight-ahead, downward, etc.), etc.

The device interface 202 may provide, in operation 308, (e.g., transmit, communicate, etc.) the position data to the system interface 204, which may store the position data in the database(s) 252, and/or provide the position data to the placement manager 208 for processing and/or storage in the database(s) 252.

In block 309, the placement manager 208 may receive and process the image(s) captured by mobile device 103. In some embodiments, the item placing placement manager 208 may receive and process the image(s) to determine that the storage space (e.g., a storing surface thereof) is within the user's field-of-view. For example, the placement manager 208, in block 309 and/or 304, may process detect and/or recognize object(s) from an, and determine the storage space, a storing surface of the storage space, etc., is depicted by the image. In some cases, the object (e.g., a portion thereof) may comprise a unique visual representation, such as a graphical marker (e.g., a QR code, bar code, etc.) representing the storage space, and the placement manager 208 may extract the marker from the image.

In block 310, the placement manager 208 may retrieve storage space data. The storage space data may describe what type of object the storing space is, dimension(s) of the storage space and/or its storing surface(s), what item(s) are currently stored in the storage space, a last state of the storage space (e.g., stacking arrangement, etc.), and/or any other relevant properties of the storage space.

In block 311, the placement manager 208 may process an orientation and which portion(s) (e.g., sides) of the storage space (e.g., storing surface(s) thereof) are accessible. In some embodiments, the orientation and the accessible side(s) may be specified in the storage space data. In some embodiments, the orientation and the accessible side(s) may be determined from an image processed in block 309.

In some embodiments, the image may reflect which sides of the storage space are accessible and which sides may be blocked by objects. The placement manager 208 may process any objects occluding or obstructing the storage space and determine the sides obstructed by those objects are inaccessible and/or determine the sides of the a that are unobstructed due to the absence of those objects from the image(s). Any suitable techniques for performing object detection and recognition may be used and are contemplated, whether currently available or available in the future.

In block 313, the placement manager 208 may determine the position of the user relative to the storage space. For instance, continuing the above example, in some embodiments, the placement manager 208 may determine a surface orientation of a storing surface of the storage space based on the first image of user view, for instance. For example, the placement manager 208 may use object information processed in block 308 to determine an orientation of the storing surface relative to a point of view of the camera that captured the first image, and determine from that orientation, a context of the storing surface, what sides of the storage space are accessible, a stacking state of the storage space (e.g., the bearing surface state (e.g., how many items are stacked, what the profile of the bearing surface is like, where the open and taken spots are, how many layers have been stacked, etc.).

In some embodiments, the particular location of the storage space may be specified in the storage space data retrieved in block 304, and the placement manger 208 may compare the position data of the mobile device 103 (which is representative of the user's position) to determine how the user is situated relative to the storage space (e.g., which side the user is on, how far the user is away from the surface, etc.)

In some embodiments, using the position data and the context of the storage space depicted in an image received and processed in block 308 and/or specified in the storage space data, the placement manager 208 may determine the surface orientation, the accessible portion(s) of the storage space, and whether the user is situated adjacent to an accessible portion (e.g., side). Using the context processed from the image, the placement manager 208 may determine which side(s) of the storage space are accessible from the position of the user/mobile device 103.

In block 314, the arrangement model processor 206 determines an arrangement model associated with the storage space. For instance, the arrangement model may be generated in time based on the storage space data and/or stacking state, and/or retrieved from the database(s) 252. The arrangement model describes one or more placement regions. Each placement region is a region in which an item can be placed on a storing surface of the storage space. In some embodiments, the arrangement model includes a reference point and region data describing each placement region in the arrangement model. As a further example, the arrangement model may comprise model data that includes one or more of a region identifier, region coordinates relative to the reference point, a region orientation, region dimensions, and a layer identifier.

Figure 7A:
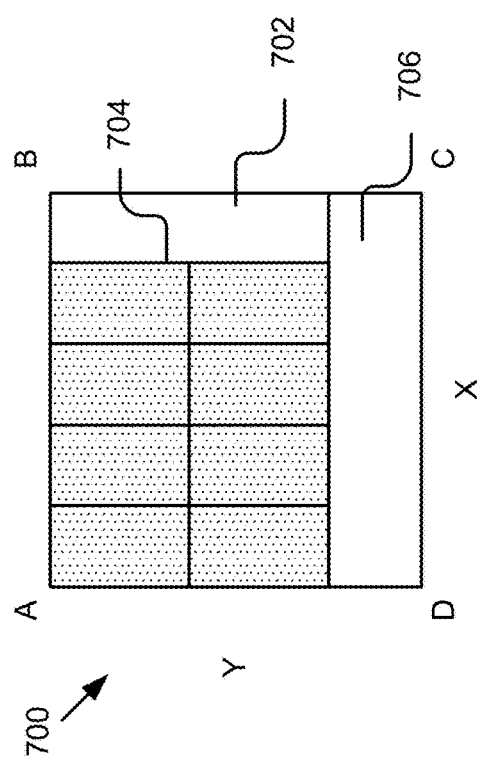
FIGS. 7A and 7C depict an example arrangement processed by the arrangement model processor.
Figure 7C:
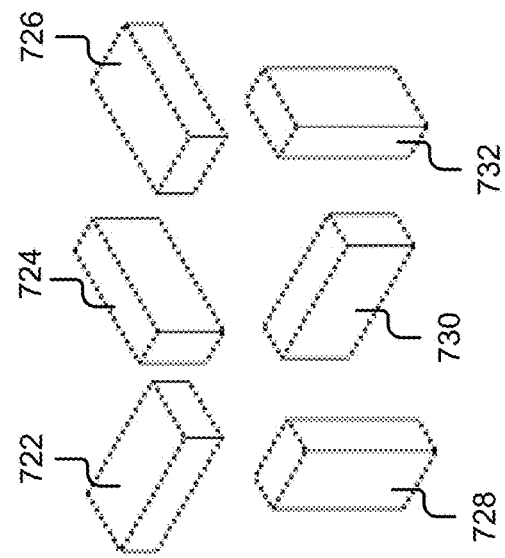
Figure 7B:
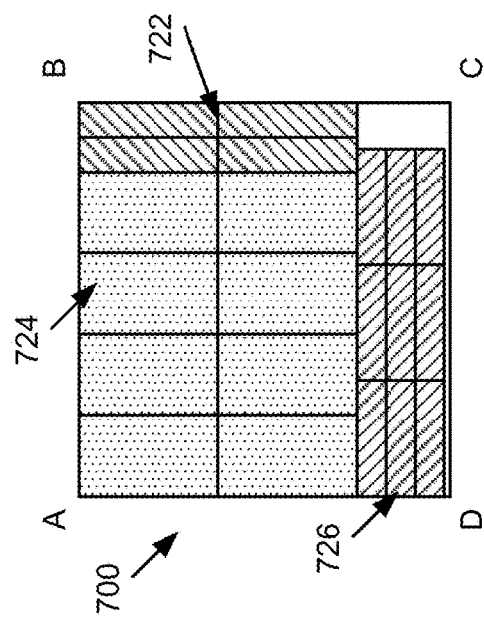
FIG. 7D depicts an example item shape and orientations.
FIGS. 7E-7H depict various outputs produced by the arrangement model processor.

FIGS. 7A-7C depict an example arrangement processed by the arrangement model processor 206, FIG. 7D depicts an example item shape and orientations, and FIGS. 7E-7H depict various outputs produced by the arrangement model processor 206.

In the depicted embodiment, the arrangement model processor 206, for the example item depicted in FIG. 7D, which is shown in 6 different stackable orientations 722, 724, 726, 728, 730, and 732 of the item/case, begins a first base trial (A) fit by virtually filling a main section 702 of a storing surface of a storage space with as many items as can fit in a first orientation (e.g., orientation 722). It repeats this process for the other orientations depicted in FIG. 7D, as stores them as base trials B-F. In this example, the empty pallet (called entity 1) may be 48"×40" inches and the item (called entity 2) may be a case, carton, box, etc.

The arrangement model processor 206 calculates the dimensions (X & Y) of the residual sections of the pallet (e.g., 702 and 706) left over after the base trial allocations are complete, the results of which are depicted in FIG. 7F. The sub trials for sections 702 and 706 are respectively referred to herein as Sub1 and Sub2. The arrangement model processor then fills sections 702 and 706 with cases for all six orientations, and stores the answers as follows:

Save answers for Sub1 as Trial A1-F1 and Num 1-6 for each (total 36); and

Save answers for Sub2 as Trial A2-F2 and Num 1-6 for each (total 36).

The results of these calculations are depicted in FIG. 7G.

In this example, trials A-F yield 432 different combinations to choose from (e.g., 6 answers for section 704 of the pallet*(36 answers for section 702 of the pallet+36 answers for section 706 of the pallet).

The arrangement model processor 206 reduces the number of combinations by selecting, from the 36 results for section 702, the maximum number of the item in each trial A-F, and stores this as a value (Cases_MaxSub1).

The arrangement model processor 206 for selects, from the 36 results for section 706, the maximum number of the item in each trial A-F, and stores this as a value (Cases_MaxSub2).

In some instances, the arrangement model processor 206 may discard any results where the height of the item between the section 704 and sections 702 and 706 do not match.

Next, the arrangement model processor 206 calculates the final number of items (entity 2) for each trial A-F using the following formula:

Number in base (704)+max number in SubTrial 1 (702)+Max of SubTrial 2 (706).

The results of the above calculations are shown in FIG. 7H.

Next, the arrangement model processor 206 selects an optimal fit, which may in some cases be the maximum number of items that can fit on the pallet (entity 1). In some cases, more than 1 trial can come up with the same result, and the arrangement model processor 206 can use the following process of elimination to select the final arrangement model.

1—Select the trial(s) with maximum number of items in final answer

2—From 1, select the trial(s) with the minimum number of layers along Z axis (stacking height) (relative to X & Y axis depicted in FIG. 7A)

3—From 2, select the trial(s) with maximum number of items in base sections

4—From 3, select the trial with lowest letter A-F.

Referring again to FIGS. 3A-3D, in some embodiments, the arrangement model and the storage space data may be combined and/or correlated, and the arrangement model processor 206 may perform the operations in blocks 313 and 314 in combination. In some cases, the arrangement model may reflect the state of the storage space instead of and/or in addition to the storage space data. Other variations are also possible and contemplated.

In block 316, the placement manager 208 matches the storage space to the arrangement model based on the surface orientation of a storing surface of the storage space and the reference point of the arrangement model.

In block 330, the method 300 implicitly or explicitly receives an input identifying a first item. In some embodiments, the user can request to scan a visual representation of the item, and in block 332, the mobile device 103, such as a wearable device (e.g., augmented or alternative reality device, etc.) can receive scan data including an item ID and transmit the scan data in operation 334 to the item placing application 105, which may receive and process the scan data including the item ID in block 336. In some embodiments, the item placing application 220 may receive, from a mobile device 103 (e.g., an augmented reality device), a first image of user view capturing a storage space (e.g., one or more storing surfaces thereof). For instance, the user can trigger the scanning of the visual representation by providing input to a sensor 110 (e.g., tap a button, issue a voice command to a microphone of the mobile device 103, nod their head (activating a motion sensor of the mobile device 103) (e.g., accelerometer, gyroscope, etc.), make a hand gesture in the field of view of the camera of the mobile device 103, etc.).

In some embodiments, one or more images of the items may be captured and provided to the item placing application 105, as shown by reference numbers 338 and 340. For instance, the mobile device 103 may, in response to the input or automatically, may capture the image, or may be capturing an image stream, such as a video stream, and may provide the video stream and/or extract frame(s) for provision to the item placing application 105.

Other variations for receiving the input and/or capturing the image are also possible and contemplated. In some embodiments, the scanning of a item ID may be automatically processed from sensor data captured of the environment by the mobile device 103. For example, a camera of the mobile device 103, such as an augmented reality device, may be sequentially capturing images of the environment in block 338. In some cases, the field-of-view of the camera may coincide with the user's field-of-view, and the images may reflect the items as the user sees them. As such, the images may reflect items within the environment, such as items the user may be looking at. The item, or a surface proximate the item, may bear a detectable mark (e.g., bar code, QR code, etc.).

The device interface 202 may provide (e.g., transmit, communicate, etc.) the image(s) (e.g., video stream, image, series of images, etc.) data to the system interface 204, which may store the image(s) in the database(s) 252, and/or the provide the image(s) to the placement manager 208 for processing.

Additionally and/or alternatively, in block 342, the placement manager 208 receives and processes the image(s) captured by mobile device 103. In some embodiments, the item placing placement manager 208 may receive and process the image(s) to determine the item(s) within the user's field-of-view. For example, the placement manager 208, in block 336 and/or 342, may process detect and recognize object(s) depicted by the image. For instance, the object may comprise a unique visual representation, such as a graphical marker (e.g., a QR code, bar code, etc.) representing a specific item, and the placement manager 208 may extract the marker from the image.

It should be understood that the operations in blocks 301 and 330, 302, and 332, 303 and 334, 305 and 338, 306 and 340, 304 and 336, and/or 309 and 342 may respectively be consolidated and/or combined, such that the storage space and item(s) are processed from the same scan data and/or image, or immediately sequential sets of scan data and images. For example, the scan data for the storage space and item(s) may be processed in the same operation, the scan data may comprise visual representations or data therefrom for both the storage space and item(s), the image(s) may depict both the storage space and item(s), the sets of scan data reflecting the visual representations of the storage space and items and the images respectively depicting the storage space and item(s) may be processed together, etc. In some cases, the unique markers identifying a given storage space and item may be depicted in the same image, and identified from the same image during the same object detection processing operation, or sequential detection operations. Other variations are also possible and contemplated.

In block 344, the placement manager 208 retrieves item data associated with the item based on the input. Continuing the above example, the item data for the first item may be retrieved using an item ID included in the scan data or processed from an image as discussed above, which may be explicitly or implicitly received.

The item data may identify the item, and specify one or more item attributes, graphics, descriptors, and/or other information. The item data may be informational and/or used to generate graphical overlay information. In some embodiments, the item data associated with an item (e.g., such as the first item referenced above) includes item dimensions of the item, a graphical representation of the item (e.g., picture of a box, product, etc., which may be non or semi-transparent in some cases), one or more colors for the item, a description of the item, a category for the item, a storage space in which the item is to be placed, a unique identifier identifying the item or type of item, etc.).

In block 346, the placement manager 208 can provide the item data for display to the user on the mobile device 103. In some distributed embodiments, the placement manager 208 transmits the item data to the mobile device 103, as shown by reference number 346, and the device interface 202 receives and renders the item data for display on the mobile device 103. For example, the placement manager 204 may provide a structured data set (e.g., JSON, HTML, etc.) and/or code (e.g., JavaScript, etc.) for processing and/or execution by the device interface 202 to render and display image(s) and/or information in an interface presented on a display of the mobile device 103. In further embodiments, the placement manager 208 may invoke a method of the device interface 202 to render the item data. Other variations are also possible and contemplated.

In block 348, the device interface 202 may receive, process, and display the item data (e.g., superimpose the graphics, text, etc., about the item) in the user view.

In block 350, the arrangement model processor 206 determines one or more placement region(s) based on the arrangement model determined in block 314. As discussed elsewhere herein, the arrangement model comprises data specifying one or more available placement regions for the item to be placed, provided the storage space (e.g., the storing surface(s)) is not full and no further placement regions are available.

In some embodiments, the operations in blocks 313, 314, and 316 may be combined with or performed in conjunction with the operations in block 350. For example, and the orientation of the user holding the item may be used to determine the relative position of the user with the item to the storing surface of the storage space, and the arrangement model associated with the storage space may be determined and matched to the storage space based on the orientation of the storage space and/or the location(s) of the available placement region(s) on the bearing surface(s) of the storing surface.

In block 352, the placement manager 208 generates overlay placement data describing the set of one or more placement region(s) and provides the placement data for presentation on the mobile device. In some distributed embodiments, the placement manager 208 transmits the overlay placement data to the mobile device 103, as shown by reference number 354, and the device interface 202 receives and renders the overlay placement data for display on the mobile device 103. For example, the placement manager 204 may provide a structured data set (e.g., JSON, HTML, etc.) and/or code (e.g., JavaScript, etc.) for processing and/or execution by the device interface 202 to render the overlays. In further embodiments, the placement manager 208 may invoke a method of the device interface 202 to render the overlay placement data. Other variations are also possible and contemplated.

In block 356, the device interface 202 may receive and superimpose the virtual item(s) on a bearing surface of the storage space in the user view based on overlay placement data. In some embodiments, the device interface 202 may instruct the mobile device 103, such as a display of the device, to superimpose one or more virtual items on bearing surface of the storage space in the user view based on the overlay placement data.

For example, in the interface being viewed by the user, which may depict the user's environment, the device interface 202 may overlay the virtual item to augment/enhance the user's view of the environment. This advantageously improves the usability of the interface by providing virtualized instructions to the user in association with the environment in which the user is working, reduces reliance on the user's preference for how the task should be completed, which is often inefficient or less safe, can reduce the amount of input the user needs to provide, and generally increases the stacking rate of the items in the storage space.

In block 358, responsive to seeing the superimposed virtual item(s) in the display, the user places the item(s) on the bearing surface of the storage space.

Figure 9A:
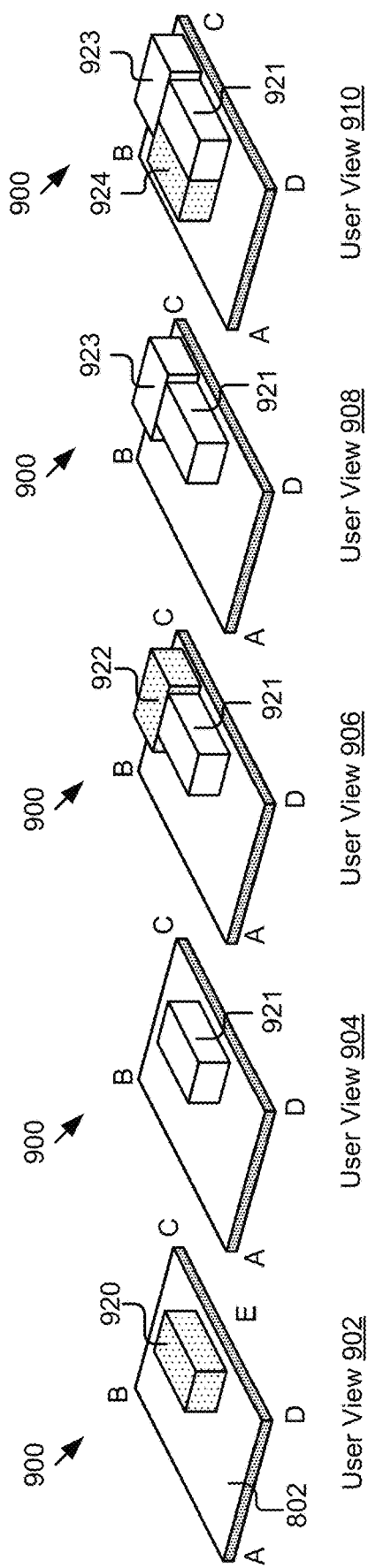
FIGS. 9A and 9B show an example stacking progression according to an example arrangement model, in which placement regions are overlaid in the interface being viewed by the user.
Figure 9B:
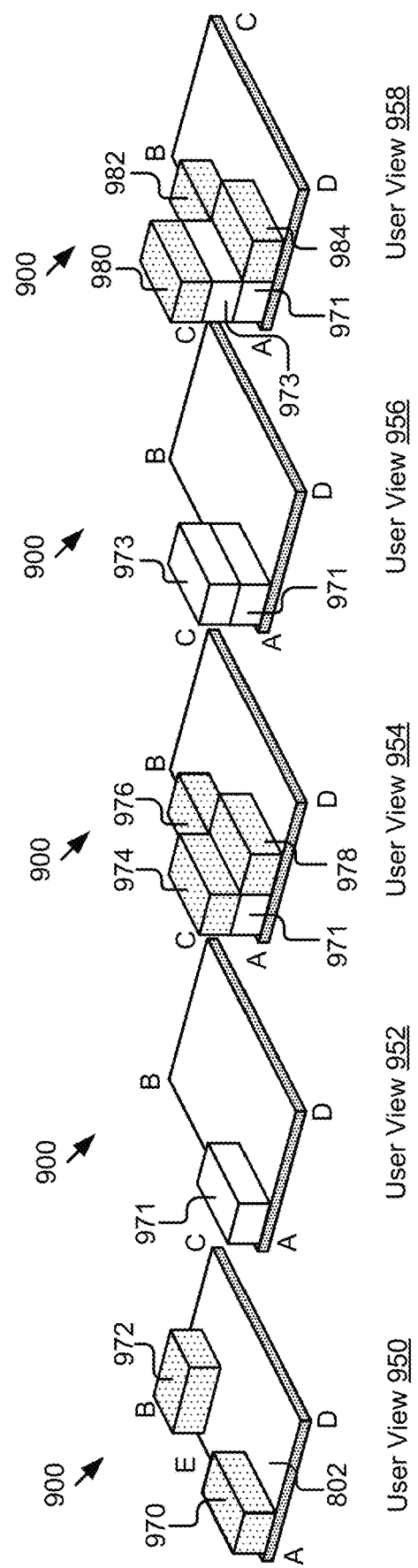

FIGS. 9A and 9B show an example stacking progression according to an example arrangement model, in which placement regions are overlaid in the interface being viewed by the user. In the depicted embodiments, augmented reality user views are shown in which the placement region overlay(s) is superimposed on the environment that the user is seeing.

More particularly, in FIG. 9A, user view 902 shows an example placement region 920, that is overlaid with the storage space 900 being viewed by the user. As shown, the storage space comprises a storing surface 802 on which items can be placed. While the sides of the storage space in this example are open, storage space data defining the storage space may have a height constraint/parameter defining a stacking height of the storage space. The volume/capacity of the storage space may be determined by the surface area of the storing surface 802 and the height constraint in this example. In some embodiments, the height parameter may be defined by the inventor management application 105 and stored as storing surface data in the database 252. For example, an administrator of a distribution facility may define the parameter or the parameter may be a predefined variable. In some embodiments, the height constraint may be automatically defined based on the characteristics of the items being stacked (e.g., heavier items can be more stably stacked higher than lighter items, lighter items are less dangerous when stacked higher than heavier items even those they are potentially less stable, larger items having a moderate weight can be stacked higher than other items because they are both more stably stacked and unlikely to tip, etc.). Other variations are also possible.

The location of the placement region 920 on the storing surface 802 of the storage space, which in this example serves as a starting point, may be determined by the arrangement model processor 206 various different ways. In a first example, the user may be standing adjacent to the storing surface 802 at or near position E, and arrangement model processor 206 may process the position data describing the user's position and may determine the position of the placement region 920 based on the user's position data. For example, the position data may describe geographic coordinates, and the arrangement model processor 206 may use those geographic coordinates to process the coordinates of the placement region 920. The arrangement model processor 206 may do so because it can determine the relative orientation of the storing surface 802 of the storage space based on the orientation data, storage space dimensions, the item dimensions, and the position of the user.

In another example, the location of the placement region 920 may be determined by default or arbitrarily. In a further example, the location of the placement region 920 may be determined based on which sides of the storing surface 802 are accessible to the user. Numerous additional variations and/or combinations of the foregoing examples are also possible and contemplated.

In user view 904, the user has stacked the item 921 in the placement region 920, and the placement manager 208 detects the placement of the item and responsively determines one or more next placement regions. For example, in user view 906 a subsequent placement region 922 is overlaid in the interface prompting the user to place an exciting in a position corresponding to the placement region 922, which the user does shown in user view 908 as reflected by item 923 being placed in the storage space 802. This process continues as shown in user view 910, in which placement region 924 is depicted to further prompt the user to place the next item in the position corresponding to the placement region, and so on and so forth.

In FIG. 9D, user view 950 shows a plurality of example placement regions that are overlaid on the bearing surface (comprising empty regions of the initial storing surface 802 and a top surface of the item 971) of the storage space 900 being viewed by the user. In particular, overlays corresponding to two placement regions 970 and 972 are depicted in user view 950. In this example, the user may be standing at location E, and the arrangement model processor 206 may select the two placement regions 970 and 972 based on the user's position as reflected by the position data. In some cases, the placement regions 970 and 972 may additionally or alternatively be based on the fact that the side A-B of the storing surface 802 of the storage space as reflected in the storage space data is being accessible. In further examples, the placement regions 970 and 972 may be selected as the best starting points for a particular stacking progression or may arbitrarily be selected from a group of possible starting point placement regions. Other variations are also possible and contemplated.

In the example depicted in FIG. 9D, the user places the item 971 in a position corresponding to the depicted overlay for placement region 970 as shown in user view 952, and the placement manager 908 detects the item's 971 placement and processes, in cooperation with the arrangement model processor 206, the next placement regions for display in the interface by an augmented reality device. For example, in user view 954, three overlays corresponding to placement regions 974, 976, and 978 are overlaid with the storage space 900 in the interface of the augmented reality device. The user then places item 973 in a position corresponding to the placement region 974, and the process repeats again in which the next set of placement regions 980, 982, and 984 are overlaid with the storage space 900 in the interface of the augmented reality device as shown by user view 958, and so on and so forth.

In some embodiments, upon stacking an item, the user may provide an input reflecting the item has been stacked, or an implicit input may be processed from the images reflecting the user's view being captured by the augmented reality device. In another example, the item's placement may be detected and recognized from image(s) (e.g., still images, video, etc.) captured by the mobile device, etc., using the processing described herein, etc.). In each case, responsive to detecting the placement of the item, the placement manager 208 can determine the next placement region(s) in conjunction with the arrangement model processor 206, and provide subsequent placement region information (e.g., overlay information) to the augmented reality device of the user for presentation, or may determine that the storage space is full and that no further items can be stacked at that time. For instance, the storage space may be considered full once the volume of the storage space has been filled with items according to the arrangement model, in which case all of the placement regions in the arrangement model have been filed.

Figure 10:
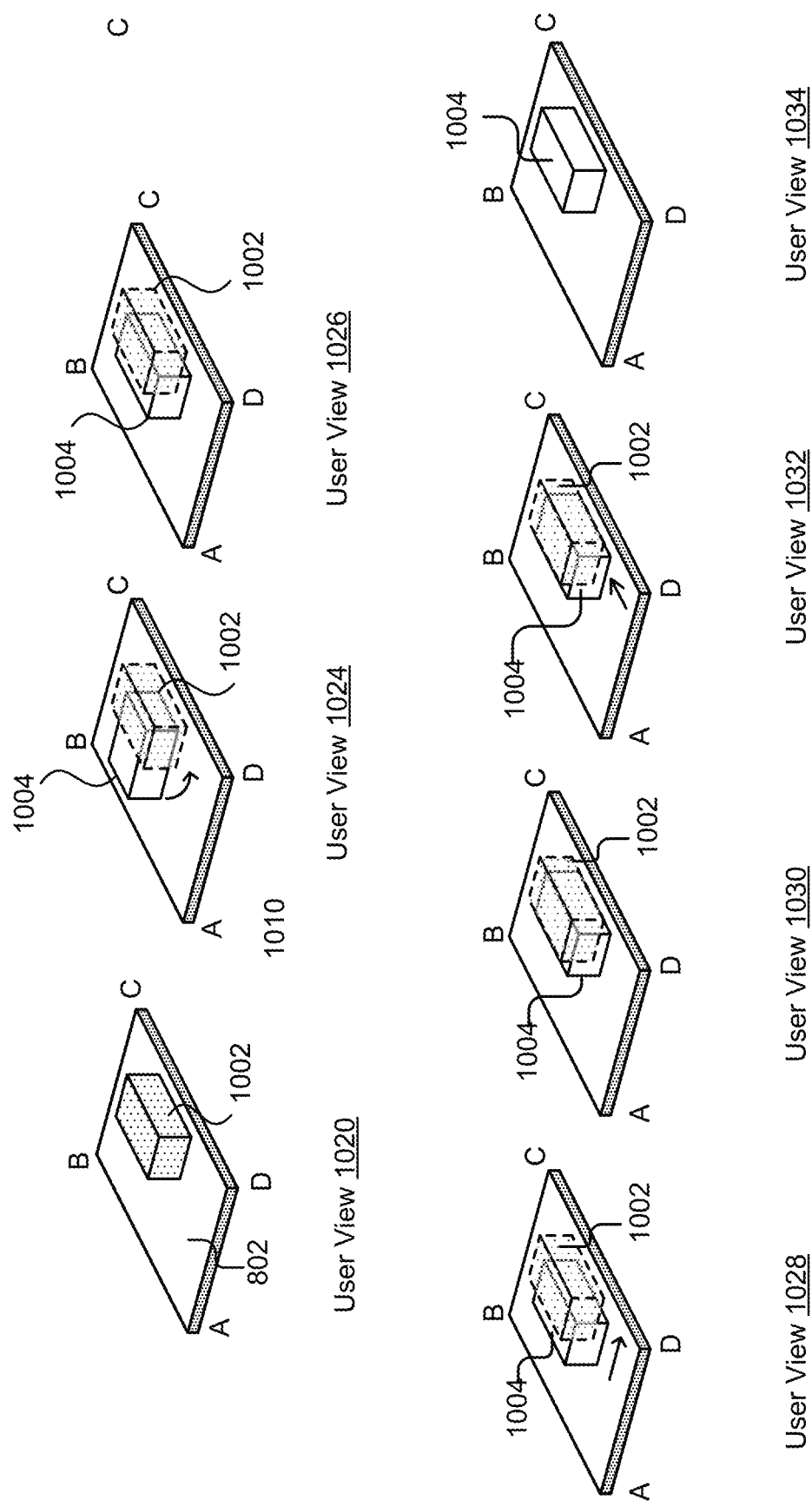
FIG. 10 depicts example stacking guidance that can be provided to the user in real time as the user stacks an item on the storing surface of the storage space.

FIG. 10 depicts example stacking guidance that can be provided to the user in real time as the user stacks an item on the storing surface 802 of the storage space. In user view 1020, graphical representation of a placement region 1002 is displayed. The user stacks and item on the storing surface 802, both the position of the item is out of place relative to the placement region 1002, so the item placement application 220 continues to display the graphical representation of the placement region 1002 in the user's view to prompt the user to reposition/ship the item.

In user view 1026, the user rotates the item to orient the item correctly, but has yet to adjust the positioning of the item in the A-D and D-C directions. In user views 1028 and 1030, the user repositions the item in the A-D direction, and in user views 1032 and 1034, the item repositions the item in the D-C direction, such that in user view 1030 for the item is located in the position and orientation that is consistent with the placement region 1002.

In some cases, the state of the graphic representation of the placement region 1002 may change based on whether or not the item is positioned correctly. For example, the graphical representation of the placement region 1002 may glow red, blink, or provide other visual feedback to the user until the items positioned correctly, at which point the state of the graphical representation of the placement region 1002 may be changed by the item placement application 220 to reflect the successful positioning of the item. For example, the graphic representation of the placement region 1002 may change from red to green, stop linking, or provide other alternative visual feedback to the user. Further examples, the item placement application 220 may provide auditory instructions by admitting sounds, voices, etc., via speaker of the mobile device 103, may provide tactile feedback by vibrating one or more motors of the mobile device 103. In some cases, the user may be wearing the mobile device 103, such as an augmented reality device, in which case directional tactile feedback may be provided to the user to prompt the user to shift the item this way or that. Numerous other variations are also possible and contemplated.

In the example depicted in FIG. 10, the item placement application 220 may continuously monitor whether the item has been placed in the proper position. In some embodiments, the position of the item may be automatically detected by processing images depicting the user's view 1024 comparing the detected position of the item to the position of the placement region. In some embodiments, the item placement application 220 may use depth image processing and multidimensional models (e.g., point clouds, etc.) to determine the relative position of the detected objects (items stacked in user view) to the arrangement model to determine whether the physical state matches the physical state. It should be understood that any suitable image sensors and processing techniques for detecting, recognizing, and processing of object and object locations, such as those currently known or discovered in the future may be used and are encompassed hereby.

In some embodiments, the item placement application 220 may rely on user confirmation that the item being stacked is positioned correctly relative to the placement region overlaid within the user's view, such as confirmation provided via voice command, pressing one or more buttons, selecting interface option, providing a gesture within the field of view the camera, etc.

Figure 4:
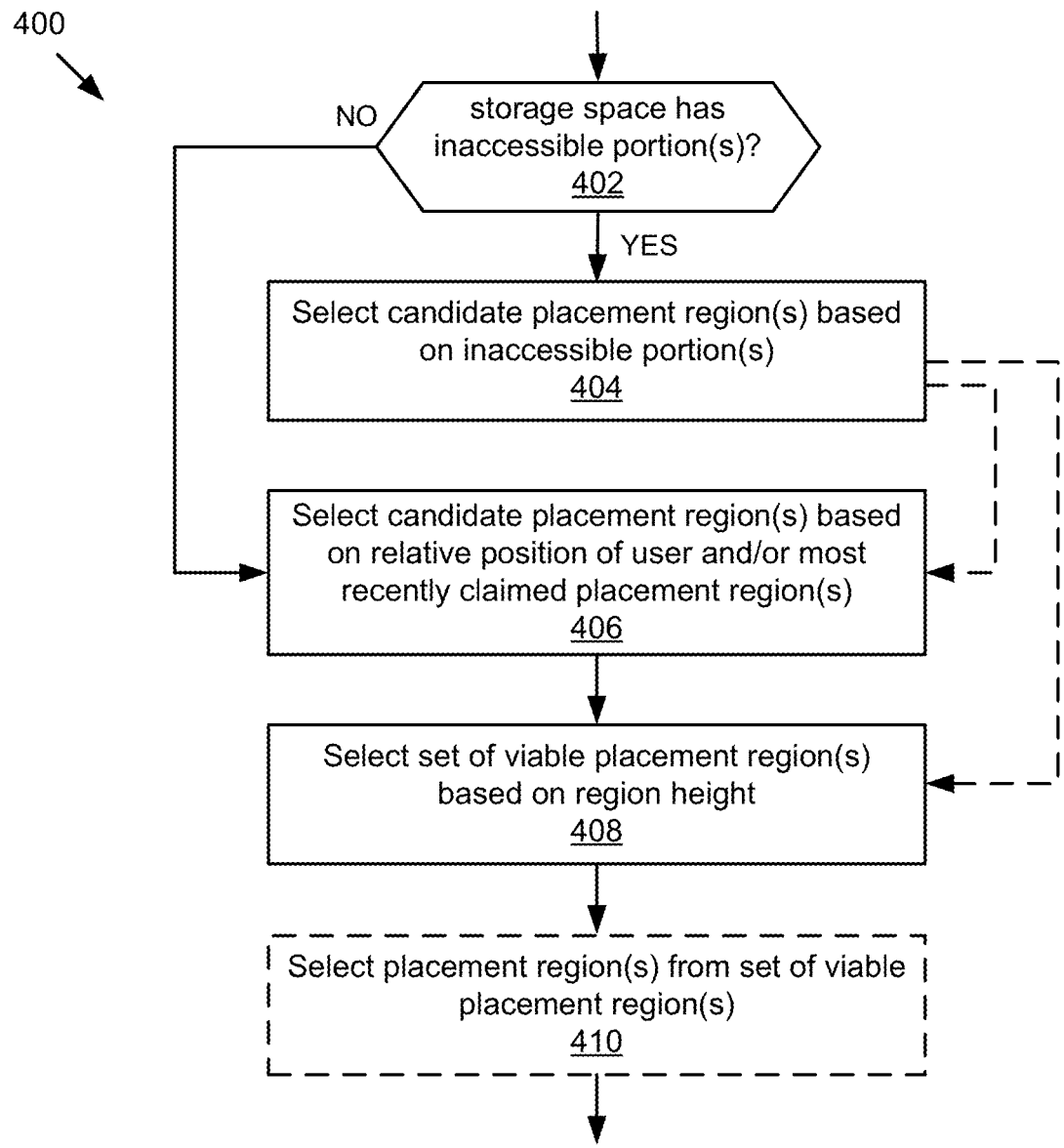
FIG. 4 is a flowchart of an example method for determining viable placement region(s).

FIG. 4 is a flowchart of an example method 400 for determining viable placement region(s).

In some embodiments, the arrangement model processor 206 determines, from the one or more placement regions in the arrangement model, a set of one or more viable placement regions for placing the item (e.g., first item) on the storing surface of the storage space. In some cases, determining the set of one or more viable placement regions for placing the item includes retrieving a stacking state of the storage space. The stacking state can indicate the available placement regions and occupied placement regions among the one or more placement regions of the arrangement model. The arrangement model processor 206 can select, from the available placement regions, candidate placement regions based on the item dimensions of the item. In some cases, the stacking state indicates a most recently claimed placement region, and selecting the candidate placement regions for that item to be placed includes selecting candidate placement regions from the available placement regions based on region coordinates of the most recently claimed placement region.

In a further example, the item data associated with the item may reflect the items dimensions, and the arrangement model processor 206 may initially select placement regions that match or can accommodate the items dimensions. This may further be considered relative to other items that are to be stacked, which the arrangement model processor 206 may have knowledge of.

For instance, the items being stacked may be part of the stacking operation being performed by the user in which the user is replenishing the items in a storage tote, or filling a pallet with items for shipment or storage. The inventory management application 105 may generate and provide the assignment for stacking the items in the source location, and list the particular items that are to be stacked. The arrangement model processor 206, based on the stacking state for the storage space, may know which items up and stacked in which items are yet to be stacked, and may optimally determine the next placement region(s) based on the dimensions of the next item to be stacked relative to the dimensions of the other items to be stacked, such that an optimal stacking configuration can be achieved, such as one that is stable and uses the least amount of room for an amount of room within certain parameters.

Referring again to FIG. 4, in block 402, the arrangement model processor 206 can determine whether the storage space has portion(s) that are inaccessible. For instance, a given storage space may have one or inaccessible portions, which may be reflected by the storage space data for that surface or may be dynamically determined from image(s) of user view as captured by the mobile device 103 and processed by the placement manager 208, although other variations are also possible and contemplated.

In block 404, responsive to determining that the storage space includes inaccessible portion(s), the arrangement model processor 206 can select candidate placement regions based on the arrangement model and the item data associated with the item. Additionally, in some cases, the arrangement model processor 206 can select, from the available placement regions, candidate placement region(s) further based on the inaccessible portion(s).

For example, the arrangement model processor 206 may select an inaccessible portion and then select one or more candidate placement regions based on the selected inaccessible portion. Inversely, if one or more of the portions of the storage space are inaccessible, the arrangement model processor 206 may determine which portion(s) of the storage space are accessible and select the candidate placement regions(s) based on the accessible portions of the storage space.

In block 406, responsive to determining that the storage space does not include inaccessible portion(s), the arrangement model processor 206 may select candidate placement regions from available placement regions based on the item dimension(s), the relative position of the user, and/or the most recently claimed placement region(s). For example, one or more next placement regions may be selected as a candidate regions because they could be considered next in the stacking sequence. In some cases, the placement manager 206 may determining the relative position of a user based on the position data and location/orientation of the storage space, and may select the candidate placement regions from the available placement regions based on the relative position of the user to the storage space.

In some embodiments, the method 400 may proceed from 404 to 406, such that the candidate placement region(s) selected in 404 may be further refined based on the relative position of the user and/or the most recently claimed placement region(s).

In block 408, the arrangement model processor 206 may select, from the candidate placement regions, a set of one or more viable placement regions based on a region height of each candidate placement region. For example, the viable placement regions may be selected because they have the same or greater region height as a height dimension of the item. In some embodiments, the most efficient viable placement region(s) may be select, such as those that match the item dimensions most close or within a certain closeness range.

In block 410, the arrangement model processor 206 may select one or more placement region(s) for placing the item from the set of one or more viable placement regions (e.g., arbitrarily, based on a distance from the user or a place in the stacking sequence, etc.), or the method 400 may use all of the viable placement region(s) for providing stacking guidance to the user.

Referring again to FIG. 3C, in block 362, the placement manager 208 may receive a placement confirmation input indicating that the to be placed item (e.g., first item) is now placed on the storing surface of the storage space. In some embodiments, as with various other inputs described herein, the placement confirmation input may be explicitly or implicitly received. For example, the user can provide express input (e.g., voice command, gesture, button-press, etc.) indicating item is been placed, and the input may be relayed by the device interface 202 to the system interface 204, and then process by the placement manager 208 to confirm the item's placement. A corresponding signal from the input device, whether it be a button-press signal, a signal from the device interface 202 processing images received from a camera and/or sound signals received from a microphone, a touch screen, and/or any other suitable input device signal, may be processed to determine that the item was successfully placed.

In some embodiments, image(s) of the user view may be captured by an image sensor of the mobile device 103, as reflected in block 364 and described elsewhere herein, and the images may be provided to an instance of the inventory management application 105 as reflected by 366.

For example, a subsequent image may be received from the augmented reality device of the user that captures the current storing surface including the first item, and the placement manager 208 may determine whether the first item is placed correctly on the storing surface of the storage space as reflected in block 370. In some embodiments, to make the determination of whether the item was placed correctly in the storage space, the placement manager 208 may process the captured image(s) as reflected by reference number 368. Various suitable techniques for processing the captured images(s) are described elsewhere herein, such as with respect to at least blocks 309 and 342, and will not be repeated here for the purpose of brevity.

Responsive to determining that the item was placed correctly on the storing surface of the storage space, the placement manager 208 may update the stacking state for the storing surface. The updated stacking state reflects the physical stacking state of the items stacked in the storage space, such as which items been stacked and where they have been stacked in relation to the storing surface and/or one another.

In some embodiments, updating the stacking state may indicate the first placement region as an occupied placement region and associate the placement region in which the item is stacked with the item. The most recently claimed placement region may be updated to reflect that it is the first placement region.

Responsive to determining that the item is placed incorrectly in the storage space, the placement manager 208 may generate overlay adjustment data describing a place adjustment for the item. The overlay adjustment data may reflect how the item should be situated. In some embodiments, the overlay adjustment data may include graphical animations animating how the item should be adjusted to achieve a proper placement. In some embodiments, the overlay adjustment data may persist the original placement data provided for display earlier in conjunction with block 352. Further examples of overlay adjustment data are described elsewhere herein, such as with respect to FIG. 10.

In operation 374, the placement manager 208 may provide the overlay adjustment data for display, such as by transmitting it to the mobile device 103, for processing by an instance of the inventory management application 105 executing thereon.

In block 376, the device interface 202 may superimpose adjustment instructions in the user view based on the overlay adjustment data. In some embodiments, the device interface 202 may instruct a display of the mobile device 103 to superimpose adjustment instructions generated using the overlay adjustment data over the environment being viewed by the user.

Responsive to seeing the adjustment instructions, the user may adjust the item on the storing surface of the storage space in block 378, such that it is consistent with the placement instructions.

Figure 5A:
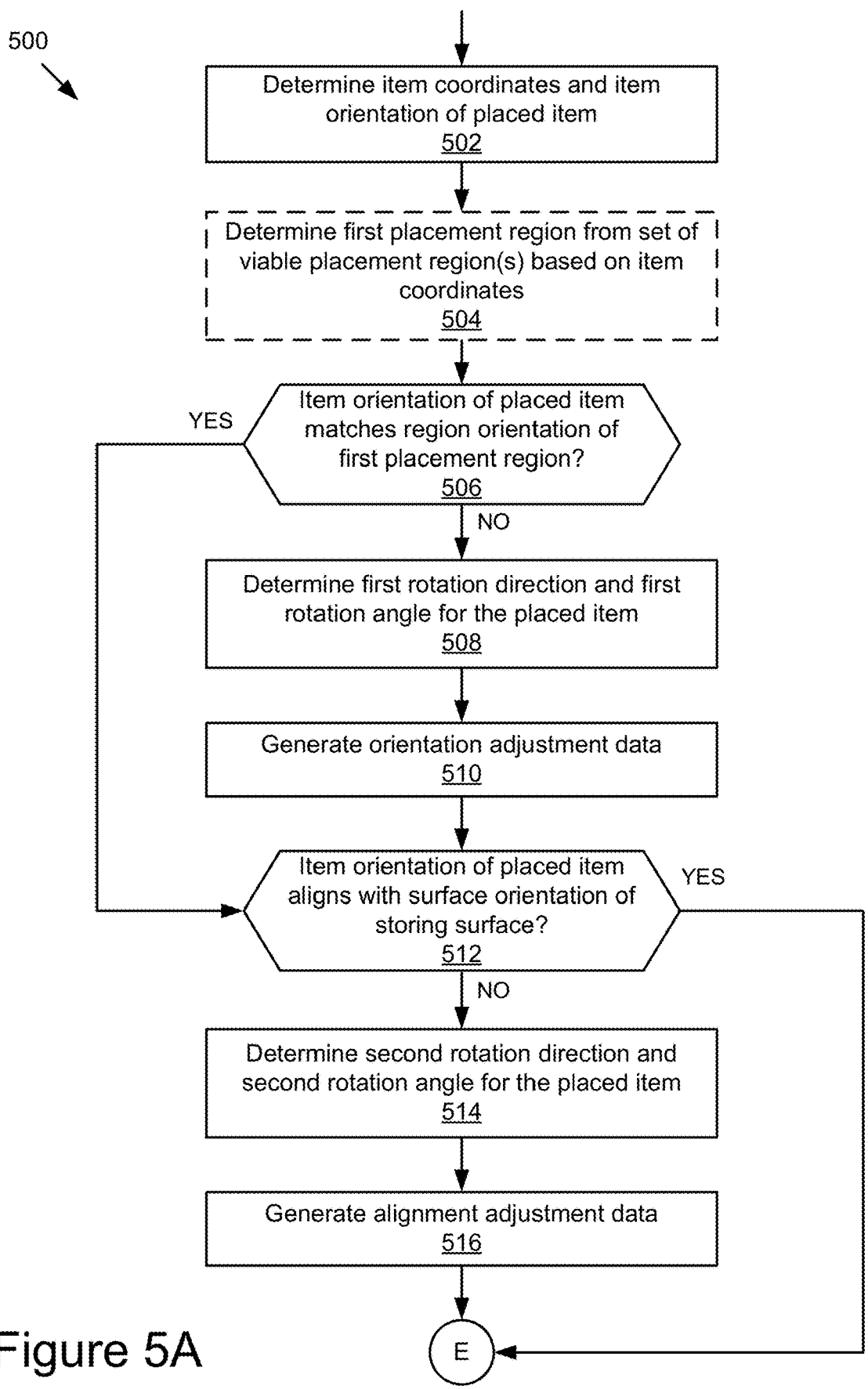
FIGS. 5A and 5B are a block diagram of an example method for adjusting placement of an item.
Figure 5B:
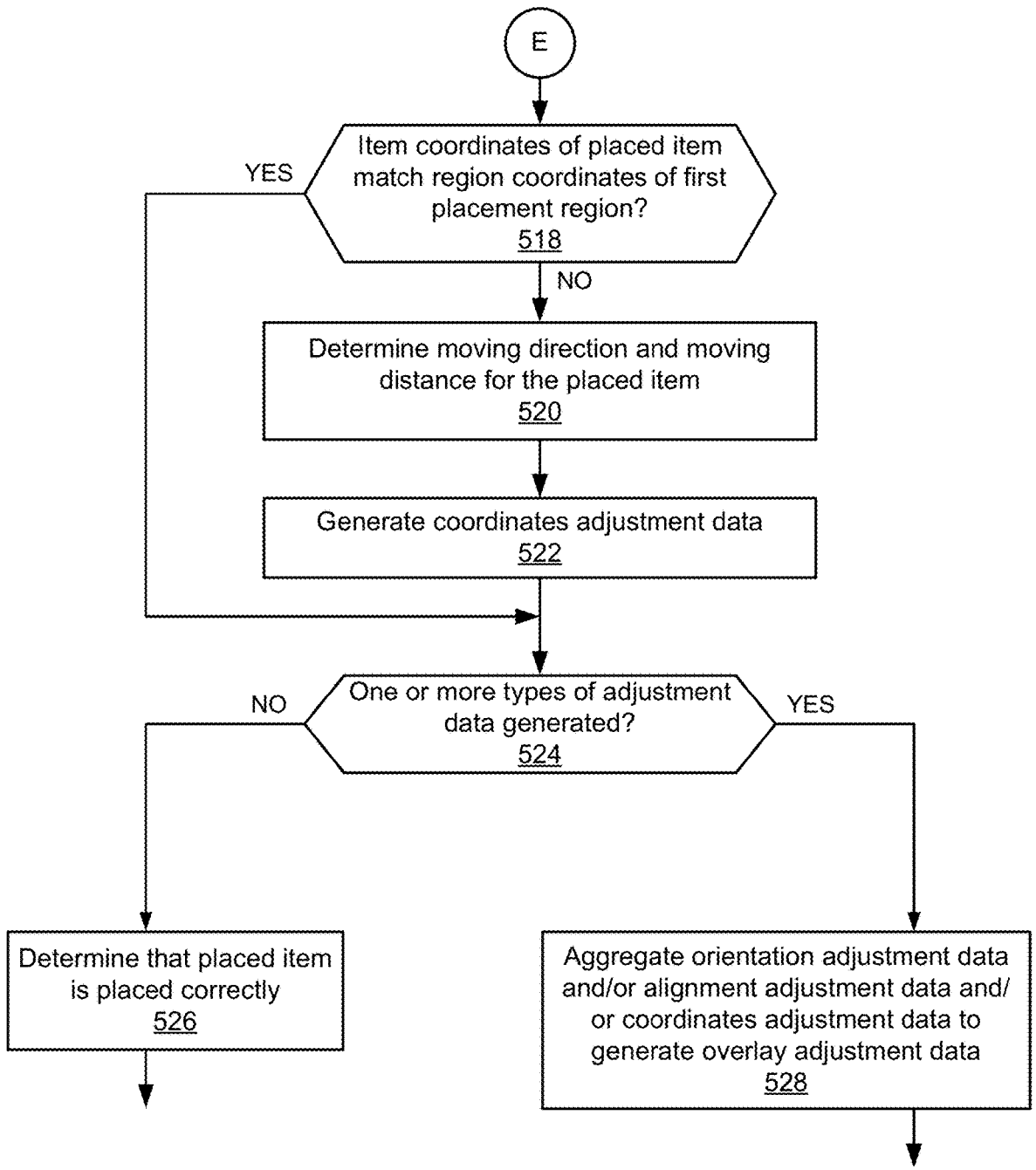

FIG. 5A is a block diagram of an example method for adjusting placement of an item (called a first item for reference purposes). In block 502, the placement manager 208 determines item coordinates of the first item on the current storing surface based on subsequent (called a second in this example) image captured of the storing surface after placement of the first item. In block 504, the placement manager 208 determines, from the set of one or more viable placement regions determined by the arrangement model processor 206 for placing the first item, a first placement region based on the item coordinates of the first item.

In block 506, the placement manager 208 determines determining whether the first item is placed correctly on the current storing surface. For example, the placement manager 208 determines whether an item orientation of the first item on the current storing surface matches a region orientation of the first placement region.

Responsive to determining that the item orientation of the first item does not match, in block 508, the placement manager 208 determines a first rotation direction and a first rotation angle for the first item based on the item orientation of the first item and region orientation of the first placement region, and generates the orientation adjustment data including the first rotation direction and the first rotation angle, as shown in block 510. The item orientation may be processed from the second image of the user view compared to the coordinates and orientation of the first placement region as reflected by the arrangement model.

Responsive to determining that the item orientation of the first item does match, the method may skip to block 512.

In block 512, the placement manager 208 determines whether an item orientation of the placed first item aligns with the surface orientation of the storing surface. The surface orientation of the current story surface may be determined based on the second image of the user view.

Responsive to determining that the orientation of the first item does not align with the surface orientation of the storing surface, the placement manager 208 determines a second rotation direction and a second rotation angle for the first item based on the item orientation of the first item and the surface orientation of the current storing surface in block 514, and generates the alignment adjustment data including the second rotation direction and the second rotation angle in block 516.

Next, in block 518, the placement manager 208 determines whether the item coordinates of the placed first item match the region coordinates of the first placement region.

Responsive to determining that the item coordinates of the placed first item do not match the region coordinates of the first placement region, the placement manager 208 determines, in block 520, a moving direction and a moving distance for the first item based on the item coordinates of the first item and region coordinates of the first placement region, and generates, in block 522, the coordinates adjustment data including the moving direction and the moving distance.

In block 524, if the determinations in blocks 506, 512, and 518 are all affirmative, then the placement manager 28 determines that the first item is placed correctly. More particularly, responsive to determining that the item orientation of the first item matches the region orientation of the first placement region, the item orientation of the first item aligns with the surface orientation of the current storing surface, and the item coordinates of the first item match the region coordinates of the first placement region, the placement manager 208 determine that the first item is placed correctly on the current storing surface.

However, if the placement manager 208 determines that one or more adjustments were identified in blocks 506, 512, and 518, then the placement manager 208 generates overlay adjustment data based on the identified adjustments. For example but not limitation, the placement manager 208 may aggregate the orientation adjustment data, the alignment adjustment data, and/or the coordinates adjustment data to generate the overlay adjustment data.

In block 382, responsive to the item being stacked, the placement manager 208 may determine whether stacking is complete? For example, the placement manger 208 may compare the stacking state of the storing surface to the arrangement model to determine whether the arrangement model is satisfied (e.g., whether the stacking state reflects all the placement regions of the arrangement model are filled, that the stacking state is consistent with the arrangement model, etc.).

If the determination in block 382 is negative, the placement manager 208 may determine to continue the stacking. In some embodiments, responsive to determining that the arrangement model is not yet satisfied, the placement manager 208 instructs the mobile device 103 to display an instruction to continue stacking/placement. For instance, in block 384, the placement manger 384 generates an instruction to continue placement and transmits the instruction in operation 386 to the mobile device 103 for processing and display.

If the determination in block 382 is affirmative, the placement manager 208 may instruct the augmented reality device to display a complete notification. In some embodiments, the placement manager 208 may generate a complete notification reflecting that stacking for the storing surface is complete (e.g., for now), and may transmit the complete notification to the mobile device 103 for processing and display in operation 392.

In block 388, the device interface 202 may process the instruction or notification received in operation 386 or 392, and render the notification for display. For instance, the device interface 202 may display a graphical user interface that presents a message indicating the result.

It should be understood that, under this disclosure, the operations, or sequences of operations depicted in FIGS. 3A-3D, may be repeated as necessary, have a different order of operations, may be combined together, or combined with other operations or methods. In some cases, if there are still items to be stacked, or if the stacking state is incomplete relative to the arrangement model, the method 300 or portions thereof may be repeated so that further items may be stacked. For instance, the method may return to point A, and another item may be scanned and/or captured by the item placement application 220, and processed for placement as described above.

In some embodiments, the inventory management application 105 can provide/be used for and/or in conjunction with a replenishment process, in which inventory may be moved into active product locations. In some cases, the inventory management application 105 can provide a user access to additional information on stacking state, arrangement (e.g., 3D cubing), and/or orientation that was previously unavailable.

In some embodiments, the replenishment process may be triggered when an active location (e.g., a location from which items can picked for shipping, purchase, etc.) reaches a replenishment threshold either (a) during picking (wave replenishment) or (b) at night after picking completes (lean replenishment). Responsive to the trigger, a user, autonomous robot, conveyance system, etc., can select cartons of product to move from reserve location(s) (e.g., reserve rack storage in the facility, etc.) to active location(s).

Using one or more sensors of the mobile device 103 (e.g., Hololens camera(s)), the user can scan the visual representation (e.g., barcode) on the container (e.g., carton label) that uniquely identifies the item. In some cases, the visual representation may be processed from image(s) captured by the sensor(s), as discussed elsewhere herein.

In some cases, the user can input any additional/necessary information into the inventory management application 106, such as but not limited to the number of cartons of items received.

The inventory management application 106 can process the information and display images of the product, and instruct the user to cut open the cartons per pre-determined cut codes and place cartons in the slot in the correct orientation that may result in an optimal utilization of the storing surface (e.g., item slot).

Once the storing surface (e.g., slot) is filled, the user may receive instructions from the warehouse management system 180 to complete the replenishment process for that storage location, and then move on to the next location, retire replenishment activity, etc.

Figure 6:
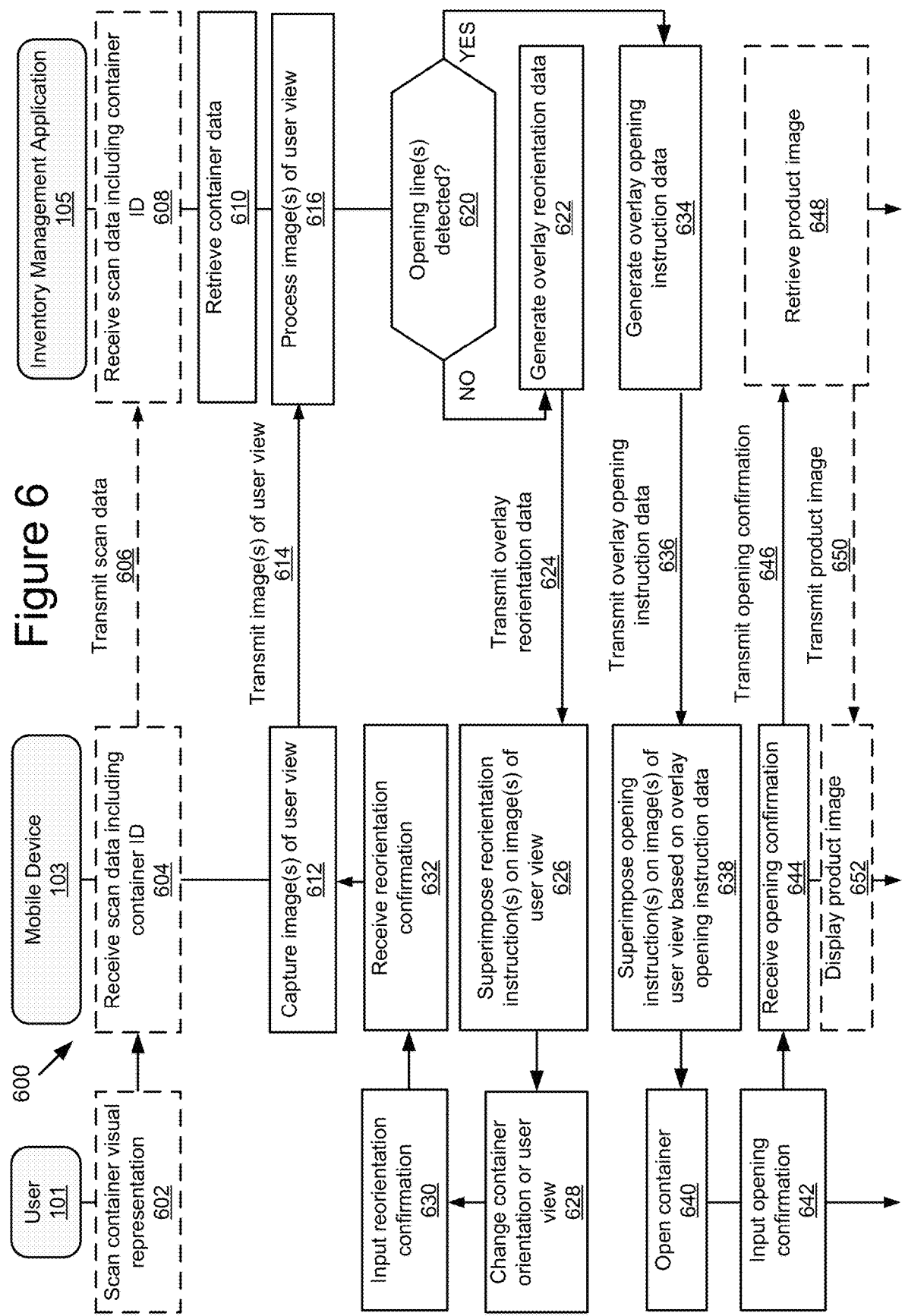
FIG. 6 is a signal diagram of an example method for providing container opening guidance.

FIG. 6 is a signal diagram of an example method 600 for providing container opening guidance.

In block 602, the user can request to scan a visual representation of the container, and in block 604, the mobile device 103, such as a wearable device (e.g., augmented or alternative reality device, etc.) can receive scan data including a container identifier (ID) and transmit the scan data in operation 606 to the container processor 210, which may receive and process the scan data including the container ID in block 608. In some embodiments, the item placing application 220 may receive, from an augmented reality device, an image depicting an identifying aspect of the container. For instance, the user can trigger the scanning of the visual representation by providing input to a sensor 110 (e.g., tap a button, issue a voice command to a microphone of the mobile device 103, nod their head (activating a motion sensor of the mobile device 103) (e.g., accelerometer, gyroscope, etc.), make a hand gesture in the field of view of the camera of the mobile device 103, etc.).

In some embodiments, one or more images of the container may be captured and provided to the item placing application 105, as shown by reference numbers 612 and 614. For instance, the mobile device 103 may, in response to the input or automatically, capture the image, or may be capturing an image stream, such as a video stream, and may provide the video stream and/or extract frame(s) for provision to the item placing application 105.

Other variations for receiving the input and/or capturing the image are also possible and contemplated. In some embodiments, the scanning of a container ID may be automatically processed from sensor data captured of the environment by the mobile device 103. For example, a camera of the mobile device 103, such as an augmented reality device, may be sequentially capturing images of the environment in block 612. The image(s) may reflect objects within the environment, such as the container(s) the user may be looking at. The container or a surrounding object may bear a detectable mark (e.g., bar code, QR code, etc.).

The device interface 202 may provide (e.g., transmit, communicate, etc.) the image(s) (e.g., video stream, image, series of images, etc.) data to the system interface 204 in operation 614, which may store the image(s) in the database(s) 252, and/or the provide the image(s) to the container processor 210 for processing.

In block 610, the container processor may retrieve container data associated with the container. The container data may specify the dimension(s) of the container, what the container contains (e.g., products, etc.), the number of items the container contains, the location where the items contained by the container should be placed, dimensions of the container, dimensions of one or more opening lines, etc., and/or any other relevant properties of the container. Block 610 may occur before or after block 616.

In block 616, the container processor 210 may receive and process the image(s) captured by mobile device 103. In some embodiments, the container processor 210 may receive and process the image(s) to determine that the container is within the user's field-of-view and/or the identity of the container. For example, the placement manager 208, in block 309 and/or 304, may process detect and recognize object(s) from an, and determine a container is depicted by the image, and then recognize the container. For instance, a portion of the container may comprise a unique visual representation, such as a graphical marker (e.g., a QR code, bar code, etc.) representing the storing surface, and the placement manager 208 may extract the marker from the image.

For example, in block 620, the container processor 210 determines whether opening line(s) have been detected in the image(s) and/or container data.

In some embodiments, the container data specifies the location of the opening line(s) relative to a reference position on the container (e.g., a label location, a certain mark on the container, a top-left corner, etc.). For example, the container data may specify the existence, dimension, and/or location of the opening line.

In some embodiments, the opening line may be included (e.g., printed, marked, labeled, etc.) on the container and may or may not be visible in the image(s) captured in block 612. The container processor 210 may detect detecting the opening line(s) on a portion of the container in an image captured by the mobile device 103 (e.g., an image of user view) based on the container data. In some embodiments, the container may bear opening marking(s), and the container processor 210 may detect the existence and/or location of the opening markings when processing the image in block 616.

Responsive to detecting opening line(s) on the container (e.g., a portion of the container) in an image depicting the container (e.g., of the user view), the container processor 210 may generate overlay opening instruction data describing an opening instruction for opening the container using the opening line (e.g., a virtual dashed line that can be superimposed on the container in an augmented reality view for the user to follow with a cutting device to open the container).

In block 634, the container processor 210 may provide the overlay opening instructions for display in the user view. In some distributed embodiments, the container processor 210 may transmit the overlay opening instruction data to the augmented reality device as reflected by operation 636.

In block, 638, the device interface 202 may instruct the mobile device to superimpose the opening instruction on the first portion of the container in the user view based on the overlay opening instruction data. The user may following the displayed container opening guidance and open the container in block 640. In block 642, the user may provide input (in a manner similar or the same as that described elsewhere herein) confirming the opening of the container (or the container processor 210 may receive subsequent images of the container and automatically determine the container is open based on the processing of the images of the open container and recognizing it is open).

In block 644, the device interface 202 may receive the opening confirmation (e.g., button press, voice command, gesture, etc.) indicating the container has been opened, and transmit the same to the container processor 210, which may retrieve an item (e.g., product) image from the database(s) 252 and/or other item information described elsewhere herein, and provide the item data (e.g., product image) for display. For example, in a distributed embodiment, the container processor 210 may transmit the product image in operation 650 to the device interface 202 of the mobile device 103, which may render the product image for display in block 652.

In block 622, responsive to determining that container processor 210 failed to detect the opening line (e.g., in an image of the user view), the container processor 210 may generate overlay reorientation data describing an orientation instruction to expose a second portion of the container (e.g., a graphical image instructing the user to rotate the container). In some embodiments, a reorientation instruction indicates a relative position of another portion or portions of the container, and/or includes a rotation direction and/or a rotation angle to expose the other portion(s) (e.g., side or sides) of the container.

In block 624, the container processor 210 may provide the overlay reorientation data for display in the user view. In some distributed embodiments, the container processor 210 may transmit the overlay reorientation data to an augmented reality device and instructing the augmented reality device to superimpose the reorientation instruction in the user view based on the overlay reorientation data. For example, the device interface 202 may receive and process the transmitted reorientation data including the instruction(s) and superimpose the reorientation instruction(s) on image(s) of the user view.

The user may follow the reorientation instruction(s) and reorient the container (e.g., turn it, turn it over, etc.), and subsequent image(s) of the container may be captured and processed to determine if the opening line(s) are now in view. If so, the method 600 may process them as described above.

More particularly, in block 630, the container processor 210 may receive a reorientation confirmation indicating that the second portion of the container is exposed or the container processor 210 may automatically detect the reorientation of the container as part of the processing performed in blocks 612 and 616.

In block 616, the container processor 210 may receive, from the mobile device, a subsequent (e.g., second) image of user view capturing the other portion(s) of the container, and in block 620, may detect whether the opening is present on the other portion(s). If not, the reorientation operations may again be repeated until the opening line(s) are detected, or the container processor 210 determines that the opening line(s) are unlikely to be detected or times out. If so, the container processor 210, detects the opening line on the second portion of the container in the image of user view as part of the processing and proceeds to block 634 as described above.

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
  receiving, from an augmented reality device, a first image of a user view capturing a storing surface of a storage space;
  retrieving an arrangement model associated with the storage space, the arrangement model describing one or more placement regions, each placement region reflecting a where an item is placeable in the storage space;
  receiving an input identifying a first item;
  retrieving item data associated with the first item based on the input;
  determining, from the one or more placement regions, a set of one or more viable placement regions for placing the first item on the storing surface based on the arrangement model and the item data associated with the first item, the one or more viable placement regions including one or more region coordinates of the first item associated with the storing surface;
  generating overlay placement data describing the set of one or more viable placement regions using the one or more region coordinates of the first item;
  transmitting the overlay placement data to the augmented reality device; and
  instructing the augmented reality device to superimpose one or more virtual items virtually representing the first item at the one or more viable placement regions in the storage space in the user view based on the overlay placement data.

2. The method of claim 1, wherein the arrangement model includes a reference point and region data describing each placement region in the arrangement model includes one or more of a region identifier, region coordinates relative to the reference point, a region orientation, region dimensions, and a layer identifier.

3. The method of claim 1, further comprising:
  determining a surface orientation of the storing surface of the storage space based on the first image of the user view; and
  matching the storage space to the arrangement model based on the surface orientation of the storing surface and the reference point of the arrangement model.

4. The method of claim 1, wherein the item data associated with the first item includes item dimensions of the first item, and wherein determining the set of one or more viable placement regions for placing the first item includes:
  retrieving a stacking state of the storage space, the stacking state indicating available placement regions and occupied placement regions among the one or more placement regions of the arrangement model;
  selecting, from the available placement regions, first candidate placement regions based on the item dimensions of the first item; and
  selecting, from the first candidate placement regions, the set of one or more viable placement regions based on a region height of each viable placement region.

5. The method of claim 4, further comprising:
  selecting a first placement region for placing the first item from the set of one or more viable placement regions.

6. The method of claim 1, wherein selecting the first candidate placement regions includes:
  determining that the storage space includes one or more inaccessible portions based on the first image of the user view;
  responsive to determining that the storage space includes the one or more inaccessible portions, selecting a first inaccessible portion from the one or more inaccessible portions; and
  selecting the first candidate placement regions from the available placement regions based on the first inaccessible portion.

7. The method of claim 1, wherein selecting the first candidate placement regions includes:
  determining a relative position of a user to the storage space; and
  selecting the first candidate placement regions from the available placement regions based on the relative position of the user to the storage space.

8. The method of claim 1, wherein the stacking state indicates a most recently claimed placement region, and wherein selecting the first candidate placement regions includes:
  selecting the first candidate placement regions from the available placement regions based on region coordinates of the most recently claimed placement region.

9. The method of claim 1, further comprising:
  receiving a placement confirmation indicating that the first item is placed on the storing surface;
  receiving, from the augmented reality device, a second image of the user view capturing a current storing surface including the first item; and
  determining whether the first item is placed correctly on the current storing surface.

10. The method of claim 9, further comprising:
  determining item coordinates of the first item on the current storing surface based on the second image of the user view; and
  determining, from the set of one or more viable placement regions for placing the first item, a first placement region based on the item coordinates of the first item.

11. The method of claim 10, wherein determining whether the first item is placed correctly on the current storing surface includes:
  determining an item orientation of the first item on the current storing surface based on the second image of the user view;
  determining whether the item orientation of the first item matches a region orientation of the first placement region;
  determining a surface orientation of the current storing surface based on the second image of the user view;
  determining whether the item orientation of the first item aligns with the surface orientation of the current storing surface;
  determining whether the item coordinates of the first item match region coordinates of the first placement region; and
  responsive to determining that the item orientation of the first item matches the region orientation of the first placement region, the item orientation of the first item aligns with the surface orientation of the current storing surface, and the item coordinates of the first item match the region coordinates of the first placement region, determining that the first item is placed correctly on the current storing surface.

12. The method of claim 10, further comprising:
responsive to determining that the first item is placed correctly on the current storing surface, updating a stacking state of the storage space;
comparing the stacking state of the storage space to the arrangement model to determine whether the arrangement model is satisfied;
responsive to determining that the arrangement model is satisfied, instructing the augmented reality device to display a complete notification; and
responsive to determining that the arrangement model is unsatisfied, instructing the augmented reality device to display an instruction of placement continue.

13. The method of claim 12, wherein updating the stacking state of the storage space includes:
indicating the first placement region as an occupied placement region;
associating the first placement region with the first item; and
updating a most recently claimed placement region to be the first placement region.

14. The method of claim 10, further comprising:
responsive to determining that the first item is placed incorrectly on the current storing surface, generating overlay adjustment data describing a place adjustment for the first item;
transmitting the overlay adjustment data to the augmented reality device; and
instructing the augmented reality device to superimpose one or more adjustment instructions on the current storing surface in the second image of the user view based on the overlay adjustment data.

15. The method of claim 14, wherein the overlay adjustment data includes orientation adjustment data, and wherein generating the overlay adjustment data for the first item includes:
determining an item orientation of the first item on the current storing surface based on the second image of the user view;
determining a first rotation direction and a first rotation angle for the first item based on the item orientation of the first item and region orientation of the first placement region; and
generating the orientation adjustment data including the first rotation direction and the first rotation angle.

16. The method of claim 14, wherein the overlay adjustment data includes alignment adjustment data, and wherein generating the overlay adjustment data for the first item includes:
determining an item orientation of the first item on the current storing surface and a surface orientation of the current storing surface based on the second image of the user view;
determining a second rotation direction and a second rotation angle for the first item based on the item orientation of the first item and the surface orientation of the current storing surface; and
generating the alignment adjustment data including the second rotation direction and the second rotation angle.

17. The method of claim 14, wherein the overlay adjustment data includes coordinate adjustment data, and wherein generating the overlay adjustment data for the first item includes:
determining a moving direction and a moving distance for the first item based on the item coordinates of the first item and region coordinates of the first placement region; and
generating the coordinate adjustment data including the moving direction and the moving distance.

18. A method comprising:
receiving, from an augmented reality device, a first image of a user view capturing a first portion of a container;
retrieving container data associated with the container;
detecting an opening line on the first portion of the container;
responsive to detecting the opening line, generating overlay opening instruction data describing an opening instruction to open the container using the opening line, the overlay opening instruction data including one or more coordinates of the opening instruction associated with the opening line;
transmitting the overlay opening instruction data to the augmented reality device; and
instructing the augmented reality device to superimpose the opening instruction on the first portion of the container in the user view based on the overlay opening instruction data using the one or more coordinates of the opening instruction.

19. The method of claim 18, further comprising:
receiving an opening confirmation indicating that the container is opened;
retrieving a product image associated with the container;
transmitting the product image to the augmented reality device; and
instructing the augmented reality device to display the product image.

20. A method comprising:
receiving, from an augmented reality device, a first image of a user view capturing a first portion of a container;
retrieving a container data associated with the container;
failing to detect an opening line on the first portion of the container;
responsive to detecting the opening line, generating overlay opening instruction data describing an opening instruction to open the container using the opening line, the overlay opening instruction data including one or more coordinates of the opening instruction associated with the opening line;
transmitting the overlay opening instruction data to the augmented reality device; and
instructing the augmented reality device to superimpose the opening instruction on the first portion of the container in the user view based on the overlay opening instruction data using the one or more coordinates of the opening instruction.

21. The method of claim 20, further comprising:
responsive to failing to detect the opening line, generating overlay reorientation data describing a reorientation instruction to expose a second portion of the container;
transmitting the overlay reorientation data to the augmented reality device; and
instructing the augmented reality device to superimpose the reorientation instruction in the user view based on the overlay reorientation data.

22. The method of claim 21, further comprising:
receiving a reorientation confirmation indicating that the second portion of the container is exposed;
receiving, from the augmented reality device, a second image of the user view capturing the second portion of the container; and
detecting the opening line on the second portion of the container.

23. The method of claim 21, wherein the reorientation instruction indicates a relative position of the second portion of the container.

24. The method of claim 21, wherein the reorientation instruction includes a rotation direction and a rotation angle to expose the second portion of the container.

* * * * *

UNITED STATES PATENT AND TRADEMARK OFFICE
CERTIFICATE OF CORRECTION

| | | |
|---|---|---|
| PATENT NO. | : 10,540,821 B2 | Page 1 of 1 |
| APPLICATION NO. | : 15/917239 | |
| DATED | : January 21, 2020 | |
| INVENTOR(S) | : Vishal Musunuri et al. | |

It is certified that error appears in the above-identified patent and that said Letters Patent is hereby corrected as shown below:

In the Claims

In Column 29, Line 23, please replace "each placement region reflecting a where an item is placeable" with --each placement region reflecting where an item is placeable--

In Column 31, Line 19, please replace "an instruction of placement continue" with --an instruction of placement continuation--

Signed and Sealed this
Fifth Day of May, 2020

Andrei Iancu
*Director of the United States Patent and Trademark Office*